(12) United States Patent
Morita et al.

(10) Patent No.: US 11,876,261 B2
(45) Date of Patent: Jan. 16, 2024

(54) FUEL CELL SYSTEM

(71) Applicant: Panasonic Intellectual Property Management Co., Ltd., Osaka (JP)

(72) Inventors: Junji Morita, Kyoto (JP); Yoshito Usuki, Osaka (JP); Takehiko Ise, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 330 days.

(21) Appl. No.: 16/386,822

(22) Filed: Apr. 17, 2019

(65) Prior Publication Data

US 2019/0356004 A1 Nov. 21, 2019

(30) Foreign Application Priority Data

May 17, 2018 (JP) .................. 2018-095508

(51) Int. Cl.
*H01M 8/04492* (2016.01)
*H01M 8/04089* (2016.01)
(Continued)

(52) U.S. Cl.
CPC ... *H01M 8/04514* (2013.01); *H01M 8/04097* (2013.01); *H01M 8/04156* (2013.01);
(Continued)

(58) Field of Classification Search
CPC ......... H01M 8/04514; H01M 8/04179; H01M 8/04164; H01M 8/04291; H01M 8/04298;
(Continued)

(56) References Cited

U.S. PATENT DOCUMENTS

2006/0121326 A1* 6/2006 Hiramatsu ........ H01M 8/04231
                                                                    429/410
2006/0246330 A1* 11/2006 Hiramatsu ............ H01M 8/241
                                                                    429/415
(Continued)

FOREIGN PATENT DOCUMENTS

DE 102009036197 A1 2/2011
DE 102009039445 A1 3/2011
(Continued)

OTHER PUBLICATIONS

The Extended European Search Report dated Jul. 1, 2019 for the related European Patent Application No. 19166165.1.

*Primary Examiner* — Stephen J Yanchuk
(74) *Attorney, Agent, or Firm* — Rimon P.C.

(57) ABSTRACT

A fuel cell system includes: a fuel cell that generates electricity using a fuel gas and an oxidant gas; a fuel gas supply path through which a fuel gas to be supplied to an anode of the fuel cell flows; a recycle gas path through which an anode off-gas emitted from the anode of the fuel cell is returned to the fuel gas supply path; a water reservoir that holds water separated from the anode off-gas flowing through the recycle gas path; a drainage path through which water stored in the water reservoir is drained; a valve provided on the drainage path; and a controller that determines, on the basis of a history of a flow rate of the anode off-gas, a length of time for which the valve continues to be opened for draining the water stored in the water reservoir.

18 Claims, 19 Drawing Sheets

(51) Int. Cl.

| | | |
|---|---|---|
| *H01M 8/04119* | (2016.01) | |
| *H01M 8/0432* | (2016.01) | |
| *H01M 8/0438* | (2016.01) | |
| *H01M 8/04537* | (2016.01) | |
| *H01M 8/04992* | (2016.01) | |
| *H01M 8/04298* | (2016.01) | |
| *H01M 8/04291* | (2016.01) | |
| *H01M 8/04082* | (2016.01) | |
| *H01M 8/04828* | (2016.01) | |
| *H01M 8/0444* | (2016.01) | |

(52) U.S. Cl.
CPC ... *H01M 8/04164* (2013.01); *H01M 8/04179* (2013.01); *H01M 8/04291* (2013.01); *H01M 8/04298* (2013.01); *H01M 8/04343* (2013.01); *H01M 8/04402* (2013.01); *H01M 8/04604* (2013.01); *H01M 8/04992* (2013.01); *H01M 8/04082* (2013.01); *H01M 8/04141* (2013.01); *H01M 8/04201* (2013.01); *H01M 8/04462* (2013.01); *H01M 8/04619* (2013.01); *H01M 8/04828* (2013.01); *Y02E 60/50* (2013.01)

(58) Field of Classification Search
CPC ......... H01M 8/04992; H01M 8/04097; H01M 8/04156; H01M 8/04343; H01M 8/04402; H01M 8/04604; H01M 8/04141; H01M 8/04201; H01M 8/04619; H01M 8/04082; H01M 8/04828; H01M 8/04462; H01M 8/0662; Y02E 60/50; Y02P 70/50
See application file for complete search history.

(56) References Cited

U.S. PATENT DOCUMENTS

| | | | |
|---|---|---|---|
| 2009/0226783 | A1 | 9/2009 | Hasegawa |
| 2010/0015484 | A1* | 1/2010 | Ishigaki ............ H01M 8/04328 429/429 |
| 2012/0115055 | A1* | 5/2012 | Wake ................ H01M 8/04164 429/414 |
| 2015/0280260 | A1 | 10/2015 | Lee et al. |
| 2017/0309938 | A1* | 10/2017 | Murata ............. H01M 8/04097 |
| 2018/0034078 | A1* | 2/2018 | Kawase ............ H01M 8/04126 |
| 2018/0159157 | A1* | 6/2018 | Usuki ................ H01M 8/0618 |
| 2018/0294493 | A1* | 10/2018 | Ogawa ............. H01M 8/04097 |
| 2018/0294497 | A1* | 10/2018 | Asai ................. H01M 8/04447 |

FOREIGN PATENT DOCUMENTS

| | | |
|---|---|---|
| DE | 102014220876 A1 | 10/2015 |
| JP | 2006-236843 A | 9/2006 |
| JP | 2008-059933 | 3/2008 |
| JP | 2017-182943 A | 10/2017 |

* cited by examiner

FUEL CELL SYSTEM

BACKGROUND

1. Technical Field

The present disclosure relates to a fuel cell system including a fuel cell that generates electricity using a fuel gas and an oxidant gas.

2. Description of the Related Art

In a fuel cell system, water is formed through an electrochemical reaction at a cathode electrode of a fuel cell stack, i.e. a reaction between hydrogen ions having passed through an electrolyte membrane from an anode electrode and oxygen contained in an oxidant gas. While most of the water formed through the electrochemical reaction becomes contained in a cathode off-gas emitted from the cathode electrode of the fuel cell stack and are released into the atmosphere, a portion of the water thus formed passes through the electrolyte membrane and moves to the anode electrode. Then, the water having moved to the anode electrode becomes contained in an anode off-gas and is drained from the another electrode of the fuel cell stack.

Note here that in a case where the fuel cell system is configured to return the anode off-gas to the anode electrode via a recycle gas path, water gradually becomes retained in a circulatory system through which the anode off-gas flows back to the anode electrode. The retention of water in the circulatory system interferes with the supply of the anode off-gas to the anode electrode and becomes a factor for inviting a decrease in power generation capacity of the fuel cell stack.

To address this problem, there has been proposed a fuel cell system configured to recover water from an anode off-gas (see, for example, Japanese Unexamined Patent Application Publication No. 2008-59933). The fuel cell system disclosed in Japanese Unexamined Patent Application Publication No. 2008-59933 includes a fuel off-gas flow channel through which a fuel off-gas (anode off-gas) flows, a drain valve fitted at the fuel off-gas flow channel, and a water volume sensor that detects the volume of water that is drained from the drain valve, estimates the volume of stored water in the fuel off-gas flow channel on the basis of the volume of water that is detected by the water volume sensor, and controls the opening and closing of the drain valve on the basis of the volume of stored water thus estimated. With this configuration, the fuel cell system disclosed in Japanese Unexamined Patent Application Publication No. 2008-59933 can highly accurately estimate the volume of water stored in the fuel off-gas channel and control the opening and closing of the drain valve.

SUMMARY

One non-limiting and exemplary embodiment provides a fuel cell system that can be manufactured at lower cost.

In one general aspect, the techniques disclosed here feature a fuel cell system including: a fuel cell that generates electricity using a fuel gas and an oxidant gas; a fuel gas supply path through which a fuel gas to be supplied to an anode of the fuel cell flows; a recycle gas path through which an anode off-gas emitted from the anode of the fuel cell is returned to the fuel gas supply path; a water reservoir that holds water separated from the anode off-gas flowing through the recycle gas path; a drainage path through which water stored in the water reservoir is drained; a valve provided on the drainage path; and a controller that determines, on the basis of a history of a flow rate of the anode off-gas, a length of time for which the valve continues to be opened for draining the water stored in the water reservoir.

The present disclosure is configured as described above and can bring about an effect of making it possible to reduce manufacturing costs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
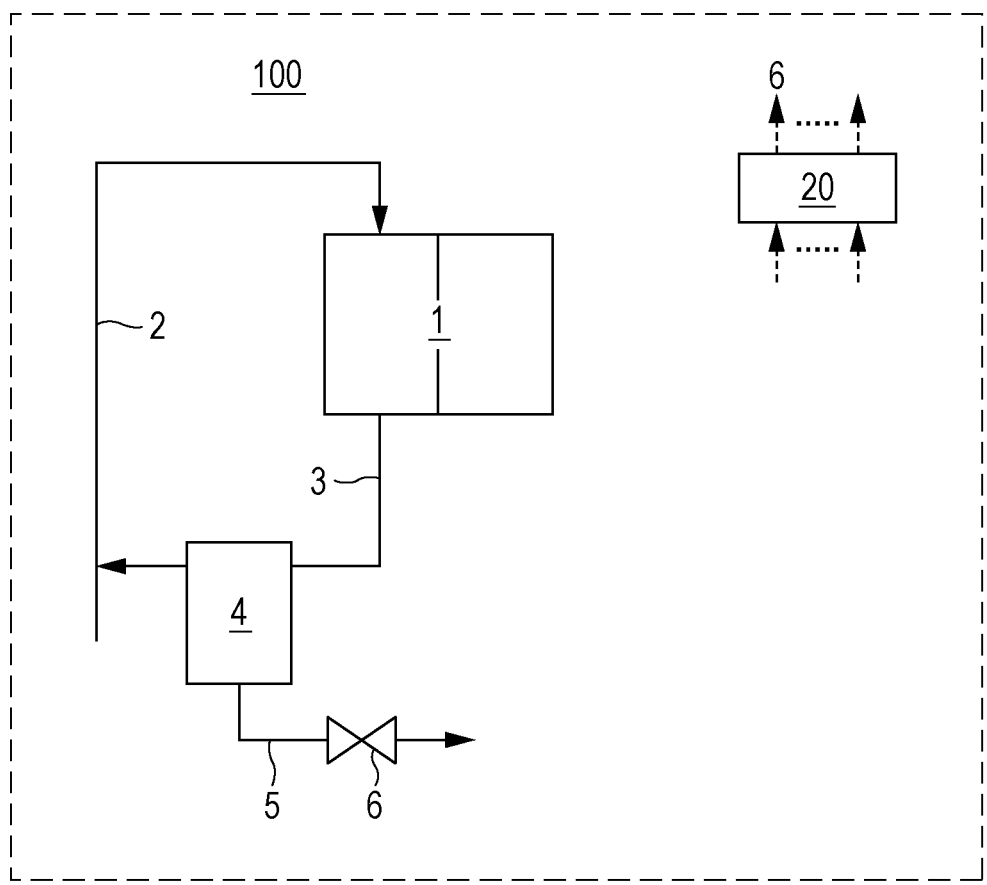
FIG. 1 is a block diagram schematically showing an example of a configuration of the main components of a fuel cell system according to Embodiment 1 of the present disclosure.

Underlying Knowledge Forming Basis of the Present Disclosure

The inventors of the present disclosure diligently studied to reduce the cost of manufacturing a fuel cell system. As a result, the inventors of the present disclosure found that a fuel cell system disclosed in a conventional technology (Japanese Unexamined Patent Application Publication No. 2008-59933) requires a separately-provided water volume sensor that undesirably raises the cost of manufacturing the fuel cell system. More specifically, the conventional technology cannot control the opening and closing of a drain valve without detecting, with a water volume sensor, the volume of water that is drained from the drain valve. This makes it necessary to provide a water volume sensor that the inventors of the present disclosure found undesirably results in an increase in the cost of manufacturing the fuel cell system.

In order to suppress such a rise in the cost of manufacturing a fuel cell system, it is desirable to minimize the number of sensors that are provided in association with control of the opening and closing of a valve that drains condensed water from an anode off-gas.

Incidentally, a change in the flow rate of an anode off-gas leads to a change in the volume of condensed water that accumulates in a drainage path. In view of this, the inventors of the present disclosure found that the volume of condensed water can be grasped on the basis of the flow rate of an anode off-gas without use of a water volume sensor.

These findings of the inventors of the present disclosure hitherto have been unrevealed and have novel technical features that bring about remarkable working effects. In particular, the present disclosure provides the aspects hereinafter described.

A fuel cell system according to a first aspect of the present disclosure includes: a fuel cell that generates electricity using a fuel gas and an oxidant gas; a fuel gas supply path through which a fuel gas to be supplied to an anode of the fuel cell flows; a recycle gas path through which an anode off-gas emitted from the anode of the fuel cell is returned to the fuel gas supply path; a water reservoir that holds water separated from the anode off-gas flowing through the recycle gas path; a drainage path through which water stored in the water reservoir is drained; a valve provided on the drainage path; and a controller that determines, on the basis of a history of a flow rate of the anode off-gas, a length of time for which the valve continues to be opened for draining the water stored in the water reservoir.

The foregoing configuration allows the controller to calculate the duration of drainage on the basis of the history of the flow rate of the anode off-gas and, on the basis of the duration of drainage, determine the length of time for which the valve continues to be opened. This makes it unnecessary, for example, to separately provide a water volume sensor in order to control the opening and closing of the valve.

The flow rate of the anode off-gas correlates with the amount of water vapor that is contained in the anode off-gas, and for example, an increase in the flow rate of the anode off-gas per unit time leads to an increase in the volume of water per unit time that is stored in the water reservoir. The flow rate of the anode off-gas may be obtained, for example, by direct detection with a flowmeter or the like, or may be calculated by detecting a parameter (e.g. the amount of electricity generated or the like) that correlates with the amount of change in the flow rate of the anode off-gas.

Therefore, the fuel cell system according to the first aspect of the present disclosure brings about an effect of making it possible to reduce manufacturing costs.

In the first aspect described above, a fuel cell system according to a second aspect of the present disclosure may be configured such that when an integrated value of the flow rate of the anode off-gas during closing of the valve prior to opening of the valve for draining the water stored in the water reservoir becomes greater than an integrated value of the flow rate of the anode off-gas prior to previous opening of the valve, the controller makes the length of time for which the valve continues to be opened for draining the water stored in the water reservoir longer than at a time of the previous opening of the valve.

Note here that when the integrated value of the flow rate of the anode off-gas during the closing of the valve becomes greater than the integrated value of the flow rate of the anode off-gas prior to the previous opening of the valve, the volume of water that is stored in the water reservoir becomes greater, too. For this reason, the controller can make the duration of drainage longer in accordance with an increase in the volume of water stored in the water reservoir.

In the first or second aspect described above, a fuel cell system according to a third aspect of the present disclosure may be configured such that the controller estimates the flow rate of the anode off-gas on the basis of an amount of electricity generated by the fuel cell.

Note here that the amount of electricity generated by the fuel cell per unit time correlates with the flow rate of the fuel gas per unit time that is supplied to the anode of the fuel cell. Specifically, an increase or decrease in the amount of electricity generated entails an increase or decrease in the flow rate of the fuel gas per unit time that is supplied to the anode of the fuel cell. Further, the amount of change in the flow rate of the fuel gas correlates with the amount of change in the flow rate of the anode off-gas. Specifically, an increase or decrease in the flow rate of the fuel gas that is supplied to the fuel cell entails an increase or decrease in the flow rate of the anode off-gas.

The foregoing configuration makes it possible to estimate the flow rate of the anode off-gas on the basis of the amount of electricity generated. This makes it possible to grasp the flow rate of the anode off-gas without providing a detector or the like that directly detects the flow rate of the anode off-gas.

In the first or second aspect described above, a fuel cell system according to a fourth aspect of the present disclosure may be configured such that the controller estimates the flow rate of the anode off-gas on the basis of a flow rate of the fuel gas at an inlet of the fuel gas supply path.

The foregoing configuration makes it possible to estimate the flow rate of the anode off-gas on the basis of the flow rate of the fuel gas at the inlet of the fuel gas supply path and therefore makes it possible to grasp the flow rate of the anode off-gas without providing a detector or the like that directly detects the flow rate of the anode off-gas.

In any one of the first to fourth aspects described above, a fuel cell system according to a fifth aspect of the present disclosure may be configured such that the controller determines, in further consideration of a history of an amount of electricity generated by the fuel cell, the length of time for which the valve continues to be opened for draining the water stored in the water reservoir.

The foregoing configuration makes it possible to determine, in further consideration of the history of the amount of electricity generated, the length of time for which the valve continues to be opened for draining the water stored in the water reservoir. Since the length of time for which the valve continues to be opened is thus determined in further consideration of the amount of water that is formed with the generation of electricity by the fuel cell, the duration of opening of the valve for draining the water stored in the water reservoir can be more accurately determined.

In the fifth aspect described above, a fuel cell system according to a sixth aspect of the present disclosure may be configured such that when an integrated value of the amount of electricity generated by the fuel cell during closing of the valve prior to opening of the valve for draining the water stored in the water reservoir becomes greater than an integrated value of the amount of electricity generated by the fuel cell prior to previous opening of the valve, the controller makes the length of time for which the valve continues to be opened for draining the water stored in the water reservoir longer than at a time of the previous opening of the valve.

While an increase in the amount of electricity generated by the fuel cell leads to an increase in water that is formed with the generation of electricity, the foregoing configuration makes it possible to make the length of time for which the valve continues to be opened longer than at the time of the previous opening with the increase in water taken into account.

In any one of the first to sixth aspects described above, a fuel cell system according to a seventh aspect of the present disclosure may be configured such that the controller determines, in further consideration of a history of a temperature of the anode off-gas, the length of time for which the valve continues to be opened for draining the water stored in the water reservoir.

The temperature of the anode off-gas here may be the temperature of the anode off-gas at an outlet of the fuel cell through which the anode off-gas is emitted, or may be the temperature of the anode off-gas from which water has been separated by condensation of the anode off-gas. In the case of the former temperature of the anode off-gas, such a relationship holds that an increase in temperature of the anode off-gas leads to an increase in the amount of water vapor that is contained in the anode off-gas. On the other hand, in the case of the latter temperature of the anode off-gas, such a relationship holds that a decrease in temperature of the anode off-gas leads to an increase in the volume of water that is separated from the anode off-gas and stored in the water reservoir.

The foregoing configuration allows the controller to determine, in further consideration of the history of the temperature of the anode off-gas, the length of time for which the valve continues to be opened. That is, in a case where the temperature of the anode-off gas is the temperature of the anode off-gas at the outlet of the fuel cell, the duration of opening of the valve for draining the water stored in the water reservoir can be determined in further consideration of the amount of water vapor that is contained in the anode off-gas. On the other hand, in a case where the temperature of the anode off-gas is the temperature of the anode off-gas from which water has been separated, the duration of opening of the valve for draining the water stored in the water reservoir can be determined in further consideration of the volume of water that is separated from the anode off-gas and stored in the water reservoir.

This allows the controller to more accurately determine the duration of opening of the valve for draining the water stored in the water reservoir.

In the seventh aspect described above, a fuel cell system according to an eighth aspect of the present disclosure may be configured such that when an integrated value of the temperature of the anode off-gas during closing of the valve prior to opening of the valve for draining the water stored in the water reservoir becomes smaller than an integrated value of the temperature of the anode off-gas prior to previous opening of the valve, the controller makes the length of time for which the valve continues to be opened for draining the water stored in the water reservoir shorter than at a time of the previous opening of the valve.

In a case where the temperature of the anode off-gas is the temperature of the anode off-gas at the outlet of the fuel cell, a decrease in temperature of the anode off-gas leads to a decrease in the amount of water vapor that is contained in the anode off-gas. According to the foregoing configuration, when the integrated value of the temperature of the anode off-gas during the closing of the valve becomes smaller than the integrated value of the temperature of the anode off-gas prior to the previous opening of the valve, the controller makes the length of time for which the valve continues to be opened shorter than at the time of the previous opening of the valve. This makes it possible to decrease, in accordance with a decrease in the amount of water vapor that is contained in the anode off-gas, the duration of opening of the valve for draining the water stored in the water reservoir.

In the seventh or eighth aspect described above, a fuel cell system according to a ninth aspect of the present disclosure may be configured such that the controller estimates the temperature of the anode off-gas on the basis of an amount of electricity generated by the fuel cell.

Note here that the amount of electricity generated by the fuel cell correlates with the amount of heat generation that occurs with the generation of electricity. That is, an increase in the amount of electricity generated by the fuel cell leads to an increase in the amount of heat generation. Further, the amount of heat generation in the fuel cell correlates with the temperature of the anode off-gas at the outlet of the fuel cell. That is, an increase in the amount of heat generation in the fuel cell leads to an increase in temperature of the anode off-gas that is emitted from the fuel cell. This makes it possible to estimate the temperature of the anode off-gas on the basis of the amount of electricity generated by the fuel cell.

Therefore, instead of being directly detected, the temperature of the anode off-gas at the outlet of the fuel cell can be estimated from the amount of electricity generated.

In the seventh or eighth aspect described above, a fuel cell system according to a tenth aspect of the present disclosure may be configured such that the controller estimates the temperature of the anode off-gas on the basis of a temperature of the fuel gas at an inlet of the fuel gas supply path.

Note here that the temperature of the fuel gas at the inlet of the fuel gas supply path correlates with the temperature of the anode off-gas at the outlet of the fuel cell. That is, an increase in temperature of the fuel gas at the inlet of the fuel gas supply path leads to an increase in temperature of the anode off-gas at the outlet of the fuel cell.

Therefore, instead of being directly detected, the temperature of the anode off-gas at the outlet of the fuel cell can be estimated from the temperature of the fuel gas at the inlet of the fuel gas supply path.

In any one of the first to tenth aspects described above, a fuel cell system according to an eleventh aspect of the present disclosure may be configured such that the controller determines, in further consideration of a history of an amount of water vapor that is contained in the anode off-gas, the length of time for which the valve continues to be opened for draining the water stored in the water reservoir.

Note here that the amount of water vapor that is contained in the anode off-gas correlates with the volume of water per unit time that is stored in the water reservoir. According to the foregoing configuration, further consideration of the history of the amount of water vapor that is contained in the anode-off gas allows the controller to more accurately determine the duration of opening of the valve for draining the water stored in the water reservoir.

In the eleventh aspect described above, a fuel cell system according to a twelfth aspect of the present disclosure may be configured such that when an integrated value of the amount of water vapor that is contained in the anode off-gas during closing of the valve prior to opening of the valve for draining the water stored in the water reservoir becomes greater than an integrated value of the amount of water vapor that is contained in the anode off-gas prior to previous opening of the valve, the controller makes the length of time for which the valve continues to be opened for draining the water stored in the water reservoir longer than at a time of the previous opening of the valve.

According to the foregoing configuration, when the integrated value of the amount of water vapor that is contained in the anode off-gas during the closing of the valve becomes greater than the integrated value of the amount of water vapor that is contained in the anode off-gas prior to the previous opening of the valve, the controller makes the length of time for which the valve continues to be opened longer than at the time of the previous opening of the valve. This makes it possible to increase, in accordance with an increase in the amount of water vapor that is contained in the anode off-gas, the duration of opening of the valve for draining the water stored in the water reservoir.

In the eleventh or twelfth aspect described above, a fuel cell system according to a thirteenth aspect of the present disclosure may be configured such that the controller estimates the amount of water vapor that is contained in the anode off-gas on the basis of an amount of electricity generated by the fuel cell.

Note here that the amount of electricity generated by the fuel cell correlates with the temperature of the anode off-gas. Further, in a case where the fuel cell is operating under fully humidified conditions, the amount of water vapor that is contained in the anode off-gas can be estimated from the temperature of the anode off-gas at the outlet of the fuel cell. For this reason, the controller makes it possible to estimate the amount of water vapor that is contained in the anode off-gas on the basis of the amount of electricity generated by the fuel cell, for example, without providing a humidity sensor that detects the amount of water vapor.

In the eleventh or twelfth aspect described above, a fuel cell system according to a fourteenth aspect of the present disclosure may be configured such that the controller estimates the amount of water vapor that is contained in the anode off-gas on the basis of an amount of water vapor that is contained in the fuel gas at an inlet of the fuel gas supply path.

Note here that the amount of water vapor that is contained in the fuel gas at the inlet of the fuel gas supply path correlates with the amount of water vapor that is contained in the anode off-gas. Further, in a case where the fuel cell is operating under fully humidified conditions, the amount of water vapor that is contained in the fuel gas can be estimated from the temperature of the fuel gas. For this reason, the controller makes it possible to estimate the amount of water vapor that is contained in the anode off-gas on the basis of the amount of water vapor that is contained in the fuel gas, for example, without providing a humidity sensor that detects the amount of water vapor.

In any one of the first to fourteenth aspects described above, a fuel cell system according to a fifteenth aspect of the present disclosure may be configured such that the controller determines, in further consideration of a pressure of the anode off-gas at a time of opening of the valve, the length of time for which the valve continues to be opened for draining the water stored in the water reservoir.

Note here that the magnitude of the pressure of the anode off-gas correlates with the drainage rate of water from the water reservoir. That is, an increase in pressure of the anode off-gas leads to an increase in the drainage rate of water from the water reservoir. This makes it possible to estimate the drainage rate of water from the reservoir on the basis of the pressure of the anode off-gas.

According to the foregoing configuration, further consideration of the pressure of the anode off-gas at the time of opening of the valve allows the controller to determine, in further consideration of the drainage rate in addition to the volume of water in the water reservoir estimated in an aspect described above, the length of time for which the valve continues to be opened. This allows the controller to more accurately determine the duration of opening of the valve for draining the water stored in the water reservoir.

In the fifteenth aspect described above, a fuel cell system according to a sixteenth aspect of the present disclosure may be configured such that when the pressure of the anode off-gas at the time of opening of the valve becomes higher than at a time of previous opening of the valve, the controller makes the length of time for which the valve continues to be opened for draining the water stored in the water reservoir shorter than at the time of the previous opening of the valve.

The foregoing configuration allows the controller to shorten, in accordance with an increase in drainage rate, the duration of opening of the valve for draining the water stored in the water reservoir.

In the fifteenth or sixteenth aspect described above, a fuel cell system according to a seventeenth aspect of the present disclosure may be configured such that the controller estimates the pressure of the anode off-gas on the basis of an amount of electricity generated by the fuel cell.

The foregoing makes it possible to estimate the pressure of the anode off-gas on the basis of the amount of electricity generated by the fuel cell and therefore makes it unnecessary, for example, to provide a manometer or the like in calculating the pressure of the anode off-gas.

While the pressure of the fuel gas at the inlet of the fuel gas supply path is constant, the pressure of the anode off-gas at the outlet of the fuel cell varies according to the amount of electricity generated by the fuel cell. In this way, there is a correlation between the amount of electricity generated by the fuel cell and the pressure of the anode off-gas at the outlet of the fuel cell, so that the pressure of the anode off-gas can be estimated from the amount of electricity generated.

In any one of the first to seventeenth aspects described above, a fuel cell system according to an eighteenth aspect of the present disclosure may be configured such that the controller causes the valve to be opened even after drainage of the water stored in the water reservoir and emits the anode off-gas via the water reservoir and the drainage path.

According to the foregoing configuration, the path of drainage of water can also serve as a path of emission of the anode off-gas. This makes it possible to simplify the configuration of the fuel cell system and makes it possible to reduce the cost of manufacturing the fuel cell system.

A fuel cell system according to a nineteenth aspect of the present disclosure includes: a fuel cell that generates electricity using a fuel gas and an oxidant gas; a fuel gas supply path through which a fuel gas to be supplied to an anode of the fuel cell flows; a recycle gas path through which an anode off-gas emitted from the anode of the fuel cell is returned to the fuel gas supply path; a water reservoir that holds water separated from the anode off-gas flowing through the recycle gas path; a drainage path through which water stored in the water reservoir is drained; a valve provided on the drainage path; and a controller that determines, on the basis of a history of an amount of electricity generated by the fuel cell, a length of time for which the valve continues to be opened for draining the water stored in the water reservoir.

The foregoing configuration allows the controller to calculate the duration of drainage on the basis of the history of the amount of electricity generated by the fuel cell and, on the basis of the duration of drainage, determine the length of time for which the valve continues to be opened. This makes it unnecessary, for example, to separately provide a water volume sensor in order to control the opening and closing of the valve.

The amount of electricity generated by the fuel cell correlates with the flow rate of the anode off-gas, which correlates with the amount of water vapor that is contained in the anode off-gas, and for example, an increase in the amount of electricity generated by the fuel cell entails an increase in the flow rate of the anode off-gas per unit time. Further, an increase in the flow rate of the anode off-gas per unit time leads to an increase in the volume of water per unit time that is stored in the water reservoir.

Therefore, the fuel cell system according to the nineteenth aspect of the present disclosure brings about an effect of making it possible to reduce manufacturing costs.

Embodiments of the present disclosure are described below with reference to the drawings. It should be noted that identical or corresponding constituent members are given identical signs throughout all of the drawings and a description of such constituent members may be omitted.

Embodiment 1

Configuration of Fuel Cell System

A fuel cell system 100 according to Embodiment 1 is described with reference to FIG. 1. FIG. 1 is a block diagram schematically showing an example of a configuration of the main components of the fuel cell system 100 according to Embodiment 1 of the present disclosure. The fuel cell system 100 according to Embodiment 1 of the present disclosure has a so-called recycle configuration in which an anode off-gas emitted from an anode of a fuel cell 1 is returned to the anode of the fuel cell 1 for circulation.

As shown in FIG. 1, the fuel cell system 100 includes the fuel cell 1, a fuel gas supply path 2, a recycle gas path 3, a water reservoir 4, a first drainage path 5 (drainage path), a valve 6, and a controller 20.

The fuel cell 1 is a device that generates electricity through an electrochemical reaction between hydrogen contained in a fuel gas and oxygen contained in an oxidant gas. The fuel cell 1 includes a stack (not illustrated) having a plurality of cells (not illustrated) joined on top of each other. The cells all include a pair of electrodes (namely an anode and a cathode) and an electrolyte constituted by a polyelectrolyte membrane and sandwiched between the two electrodes. The fuel cell 1 includes an anode channel (not illustrated) through which the fuel gas to be supplied to the anode of each cell flows, a cathode channel (not illustrated) through which the oxidant gas to be supplied to the cathode of each cell flows, and a cooling water channel (not illustrated) through which cooling water for cooling the stack flows.

The fuel gas supply path 2 is a channel though which the fuel gas is supplied to the anode of the fuel cell 1, and connects a fuel gas supply source (not illustrated) to an inlet of the anode channel of the fuel cell 1. This fuel gas is hydrogen containing water vapor or a gas that contains hydrogen containing water vapor, and a usable example of this fuel gas is a reformed gas that is obtained through a reforming reaction of source gas such as city gas in a reformer or hydrogen that is obtained from water electrolysis or the like. The fuel gas supply path 2 may be provided with a humidifier (not illustrated) that humidifies the fuel gas.

The recycle gas path 3 is a circulatory channel whose one end is connected to an outlet of the anode channel of the fuel cell 1, whose other end is connected to the fuel gas supply path 2, and through which the anode off-gas emitted from the anode is returned to the fuel gas supply path 2. As shown in FIG. 1, the recycle gas path 3 is connected in the middle of the fuel gas supply path 2, and allows the anode off-gas to merge with the fuel gas flowing through the fuel gas supply path 2.

While the fuel cell 1 generates electricity using hydrogen contained in the fuel gas, the anode off-gas that is emitted from the fuel cell 1 contains hydrogen that was not used in generating electricity. For this reason, the fuel cell system 100 is configured to reutilize the anode off-gas as a fuel gas. That is, the anode off-gas emitted from the outlet of the anode channel of the fuel cell 1 is returned to the fuel gas supply path 2 via the recycle gas path 3 and merges with the fuel gas flowing through the fuel gas supply path 2. Then, the anode off-gas, mixed with the fuel gas, is supplied to the anode of the fuel cell 1 again.

The water reservoir 4 is a device designed to hold water (condensed water) separated from the anode off-gas flowing through the recycle gas path 3. For example, the water reservoir 4 includes a tank, a pipe, and the like. As an example of placement of the water reservoir 4 designed to hold condensed water separated from the anode off-gas flowing through the recycle gas path 3, the water reservoir 4 may be provided on the recycle gas path 3 as shown in FIG. 1. Further, a gas-liquid separator (not illustrated) for separating water (condensed water) from the anode off-gas may be provided upstream of the water reservoir 4 in the direction of flow of the anode off-gas.

That is, in the fuel cell system 100, water formed through an electrochemical reaction between hydrogen and oxygen in the fuel cell 1 or water added to the fuel gas by the humidifier enters the anode and the anode channel from the cathode and the cathode channel through the electrolyte membrane. These types of water, which are present as water vapor during generation of electricity because the fuel cell 1 is hot during generation of electricity, are condensed by losing heat in flowing through the recycle gas path 3 and stored in the water reservoir 4.

The first drainage path 5 is a channel whose one end is connected to the water reservoir 4 and through which water (condensed water) stored in the water reservoir 4 is drained. The first drainage path 5 may be configured to have the other end connected to the cooling water channel (not illustrated) and cause water flowing through the first drainage path 5 to merge with the cooling water flowing through the cooling water channel. Alternatively, the first drainage path 5 may be configured to have the other end open to the atmosphere and cause water to be drained out of the system through the first drainage path 5. The anode off-gas from which water has been removed may be drained through the first drainage path 5, or may be drained through another drainage path provided separately from the first drainage path 5.

The valve 6 is a device, provided on the first drainage path 5, that controls the flow rate of condensed water that flows through the first drainage path 5. The valve 6 may be any device that can open the channel of the first drainage path 5 to cause water stored in the water reservoir 4 to be drained out and can close the channel of the first drainage path 5 to stop draining the water. A usable example of the valve 6 is a solenoid valve. The valve 6 may be a control valve or an on-off valve.

The controller 20 includes an arithmetic section (not illustrated) such as a CPU and a storage section (not illustrated) such as a ROM or a RAM. The storage section has stored therein a basic program that causes each component of the fuel cell system 100 to operate and information such as various types of fixed data, and the arithmetic section reads out and executes software such as this basic program, whereby the controller 20 can control various types of action of each component. The controller 20 may be constituted by a single controller that exercises centralized control, or may be constituted by a plurality of controllers that exercise decentralized control in cooperation with each other.

The fuel cell system 100 may be configured such that, for example, when a predetermined period of time elapses or in response to an instruction or the like from an operator, the controller 20 gives a command to open the valve 6 so that the valve 6 can be brought into an open state. Further, on the basis of the flow rate of the anode off-gas, the controller 20 may calculate the duration of drainage of the water stored in the water reservoir 4, and on the basis of the duration of drainage thus calculated, the controller 20 may give a command to close the valve 6 so that the valve 6 can be brought into a closed state.

Further, as the anode off-gas circulates in the fuel cell system 100, impurities having passed through the polyelectrolyte membrane of the fuel cell 1 gradually become accumulated in the anode off-gas. Since an increase in the concentration of impurities leads to a decrease in power generation efficiency of the fuel cell 1, it is necessary to drain the anode off-gas in order to expel impurities at a given timing. For that purpose, the fuel cell system 100 may be configured such that the anode-off gas in which impurities have been accumulated is emitted via the first drainage path 5, or may be configured such that the anode off-gas is emitted from an emission path (not illustrated), provided separately from the first drainage path 5, that branches off from the recycle gas path 3 or the water reservoir 4.

Operating Method

Figure 2:
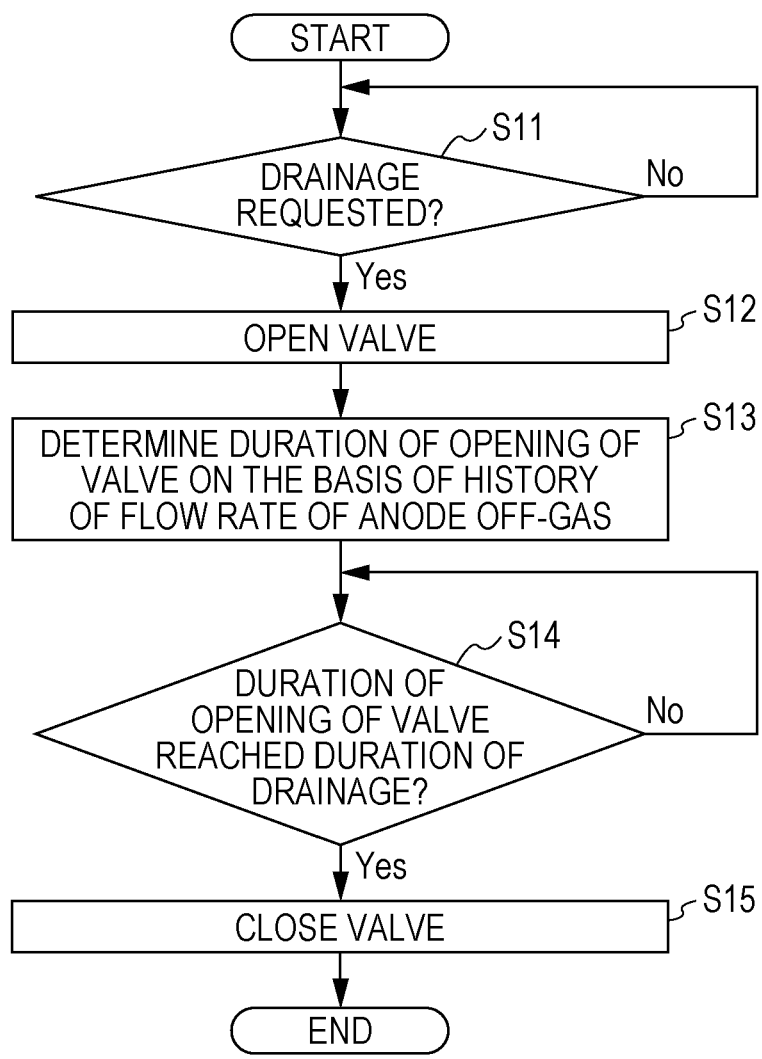
FIG. 2 is a flow chart showing an example of a method for operating the fuel cell system shown in FIG. 1.

A method for operation the fuel cell system 100, particularly a method for controlling the opening and closing of the valve 6 of the first drainage path 5 in the fuel cell system 100, is described with reference to FIG. 2. FIG. 2 is a flow chart showing an example of the method for operating the fuel cell system 100 shown in FIG. 1. Each step of this operating method can be execute by the controller 20 reading out and executing the basic program to control each device. It should be noted that air is used as the oxidant gas in an embodiment of the present disclosure.

First, in the fuel cell system 100, the controller 20 determines whether there has been a request for drainage of the anode off-gas (step S11). A request for drainage of the anode off-gas may be made by an operator inputting an instruction, or may be made at predetermined time intervals according to how the fuel cell 1 is operating. For example, in a case where the fuel cell 1 is operating at a rated output, a request for drainage of the anode off-gas may be made every 10 minutes.

In a case where the controller 20 has determined in step S11 that there has been a request for drainage of the anode off-gas ("Yes" in step S11), the controller 20 exercises control to open the valve 6 of the first drainage path 5 (step S12). This causes the water stored in the water reservoir 4 to be drained out via the valve 6 by passing through the first drainage path 5. The controller 20 is not only configured to exercise control to open the valve 6 but also configured to control a timer (not illustrated) so that the timer measures a period of time having elapsed since the valve 6 opened. Further, while there is no request for drainage ("No" in step S11), the controller 20 repeatedly makes a determination in step S11.

Next, the controller 20 determines the duration of opening of the valve 6 by estimating, on the basis of a history of the flow rate of the anode off-gas, the duration of drainage it takes to drain all of the water stored in the water reservoir 4 through the first drainage path 5 (step S13). That is, the controller 20 records, as history information, time-dependent changes in the flow rate of the anode off-gas during the closing of the valve 6 and estimates the duration of drainage from an integrated value of the flow rate of the anode off-gas. Then, on the basis of the duration of drainage thus estimated, the controller 20 determines the duration of opening of the valve 6 for draining the water stored in the water reservoir 4.

Figure 3:
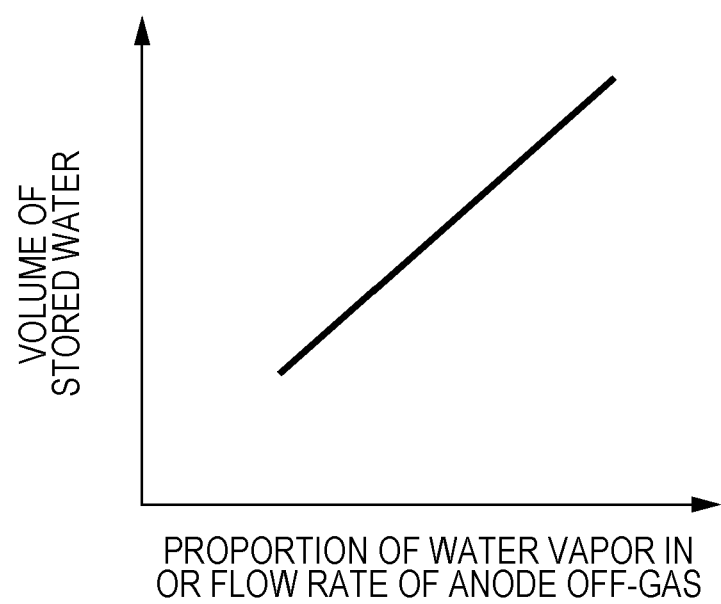
FIG. 3 is a graph showing a general correlation between the volume of stored water in a water reservoir of the fuel cell system according to Embodiment 1 of the present disclosure and the proportion of water vapor contained in an anode off-gas or the flow rate of the anode off-gas.

A determination of the volume of stored water stored in the water reservoir 4 involves the use of a relationship shown in FIG. 3. FIG. 3 is a graph showing a general correlation between the volume of stored water in the water reservoir 4 of the fuel cell system 100 according to Embodiment 1 of the present disclosure and the proportion of water vapor contained in the anode off-gas or the flow rate of the anode off-gas. In FIG. 3, the horizontal axis represents the proportion of water vapor contained in the anode off-gas or the flow rate of the anode off-gas, and the vertical axis represents the volume of stored water in the water reservoir 4. FIG. 3 shows a general relationship between the proportion of water vapor contained in the anode off-gas or the flow rate of the anode off-gas and the volume of stored water in the water reservoir 4.

The controller 20 compares the duration of opening of the valve 6 as determined in step S13 with the elapsed time measured by the timer and thereby determines whether the length of time (duration of opening) that the valve 6 continues to be in an open state has reached the duration of drainage (step S14). In a case where the controller 20 has determined that the duration of opening of the valve 6 as determined in step S13 has reached the duration of drainage ("Yes" in step S14), the controller 20 exercises control to close the valve 6 (step S15). On the other hand, while controller 20 determines that the duration of opening of the valve 6 as determined in step S13 has not reached the duration of drainage ("No" in step S14), the controller 20 repeatedly exercises control to determine whether the duration of opening of the valve 6 has reached the duration of drainage.

In the aforementioned method for operating the fuel cell system 100, the controller 20 calculates the duration of opening of the valve 6 after having exercised control to open the valve 6. Alternatively, steps S13 and 12 may be transposed so that the controller 20 calculates the duration of opening of the vale 6 before opening the valve 6.

While the controller 20 determines that there is no request for drainage ("No" in step S11), the controller 20 repeatedly exercises control to determine whether there has been a request for drainage.

As noted above, the fuel cell system 100 according to Embodiment 1 estimates, on the basis of the history of the flow rate of the anode off-gas, the duration of drainage of the water stored in the water reservoir 4. Incidentally, the flow rate of the anode off-gas correlates with the amount of electricity generated by the fuel cell 1. Accordingly, a direct calculation of the flow rate of the anode off-gas may be replaced by the designation of the duration of drainage of the water stored in the water reservoir 4 from a history of the amount of electricity generated by the fuel cell 1.

Modification 1 of Embodiment 1

Figure 4:
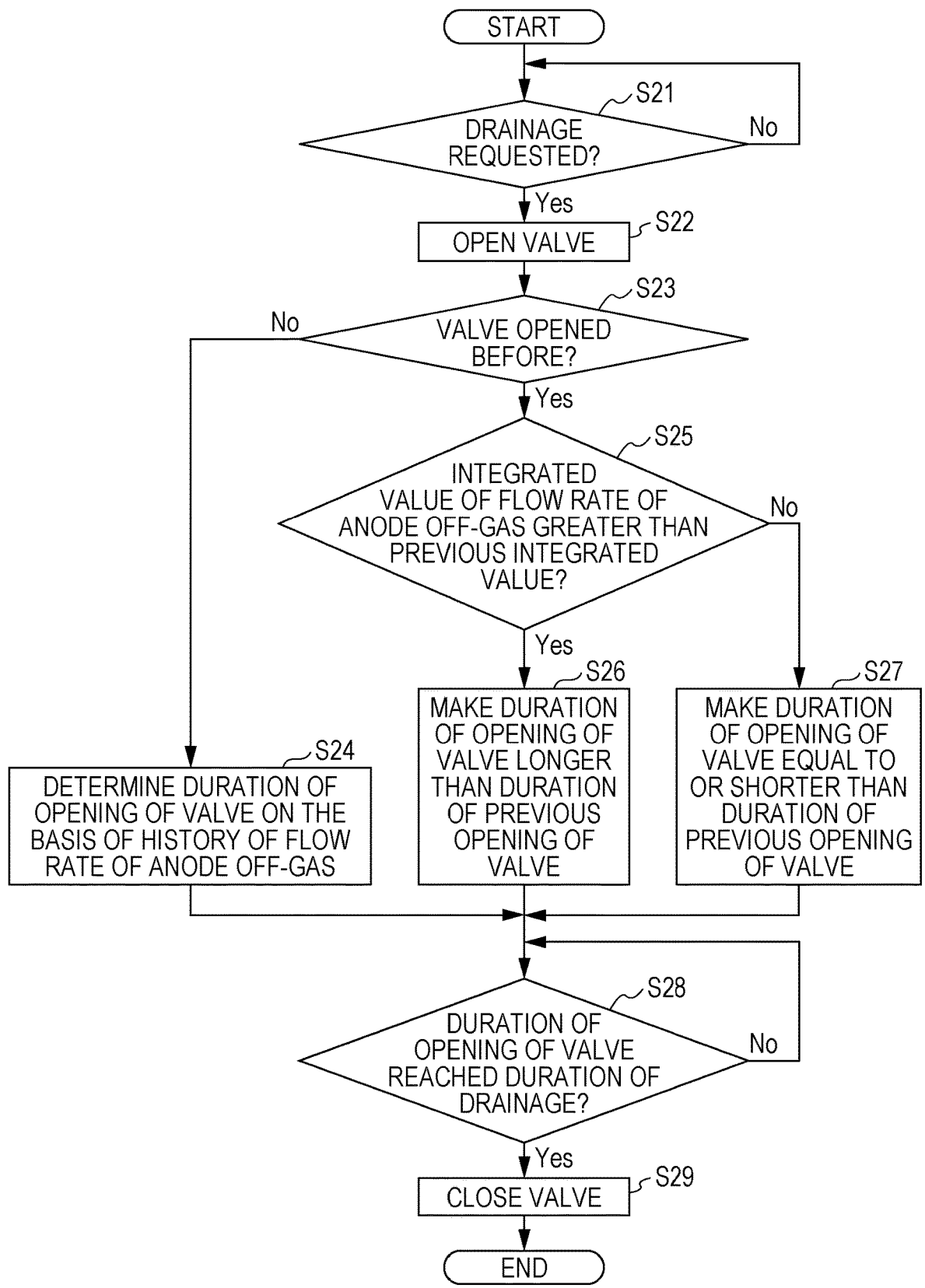
FIG. 4 is a flow chart showing an example of the method for operating the fuel cell system shown in FIG. 1.

A fuel cell system 100 according to Modification 1 of Embodiment 1 is described with reference to FIG. 4. FIG. 4 is a flow chart showing an example of the method for operating the fuel cell system shown in FIG. 1. Since the fuel cell system 100 according to Modification 1 of Embodiment 1 is identical in device configuration to the fuel cell system 100 according to Embodiment 1, a description of the components is omitted.

Operating Method

In the fuel cell system 100 according to Modification 1 of Embodiment 1, the controller 20 determines whether there has been a request for drainage of the anode off-gas (step S21). In a case where the controller 20 has determined in step S21 that there has been a request for drainage of the anode off-gas ("Yes" in step S21), the controller 20 exercises control to open the valve 6 of the first drainage path 5 (step S22). This causes the water stored in the water reservoir 4 to be drained out via the valve 6 by passing through the first drainage path 5. The controller 20 is not only configured to exercise control to open the valve 6 but also configured to control a timer (not illustrated) so that the timer measures a period of time having elapsed since the valve 6 opened. Further, while there is no request for drainage ("No" in step S21), the controller 20 repeatedly makes a determination in step S21.

Next, the controller 20 determines whether it has opened the valve 6 before (step S22). In a case where this is the first time that the controller 20 opens the valve 6 ("No" in step S23), the controller 20 proceeds to step S24. Since step 24 is identical to step S13 shown in FIG. 2, a description of step S24 is omitted.

On the other hand, in a case where the controller 20 has determined that it has opened the valve 6 before ("Yes" in step S23), the controller 20 determines whether an integrated value of the flow rate of the anode off-gas during the closing of the valve 6 is greater than an integrated value of the flow rate of the anode off-gas during the closing of the valve 6 prior to the previous opening of the valve 6 (step S25).

In a case where the controller 20 has determined in step S25 that the integrated value of the flow rate of the anode off-gas is greater than the previous integrated value of the flow rate of the anode off-gas ("Yes" in step S25), the controller 20 makes the duration of opening of the valve 6 for draining the water stored in the water reservoir 4 longer than the duration of the previous opening (step S26).

Further, in the case of "No" in step S25, i.e. in a case where the integrated value of the flow rate of the anode off-gas is equal to or smaller than the previous integrated value of the flow rate of the anode off-gas, the controller 20 makes the duration of opening of the valve 6 for draining the water stored in the water reservoir 4 equal to or shorter than the duration of the previous opening (step S27).

By thus comparing the integrated value of the flow rate of the anode off-gas previously calculated with the integrated value of the flow rate of the anode off-gas calculated this time, the duration of opening of the valve 6 for draining the water stored in the water reservoir 4 can be easily determined. Since subsequent steps S28 and S29 are identical to steps S14 and S15 shown in FIG. 2, respectively, a description of steps S28 and S29 is omitted. Further, steps S23 to S27 may be executed before step S22.

Modification 2 of Embodiment 1

Figure 5:
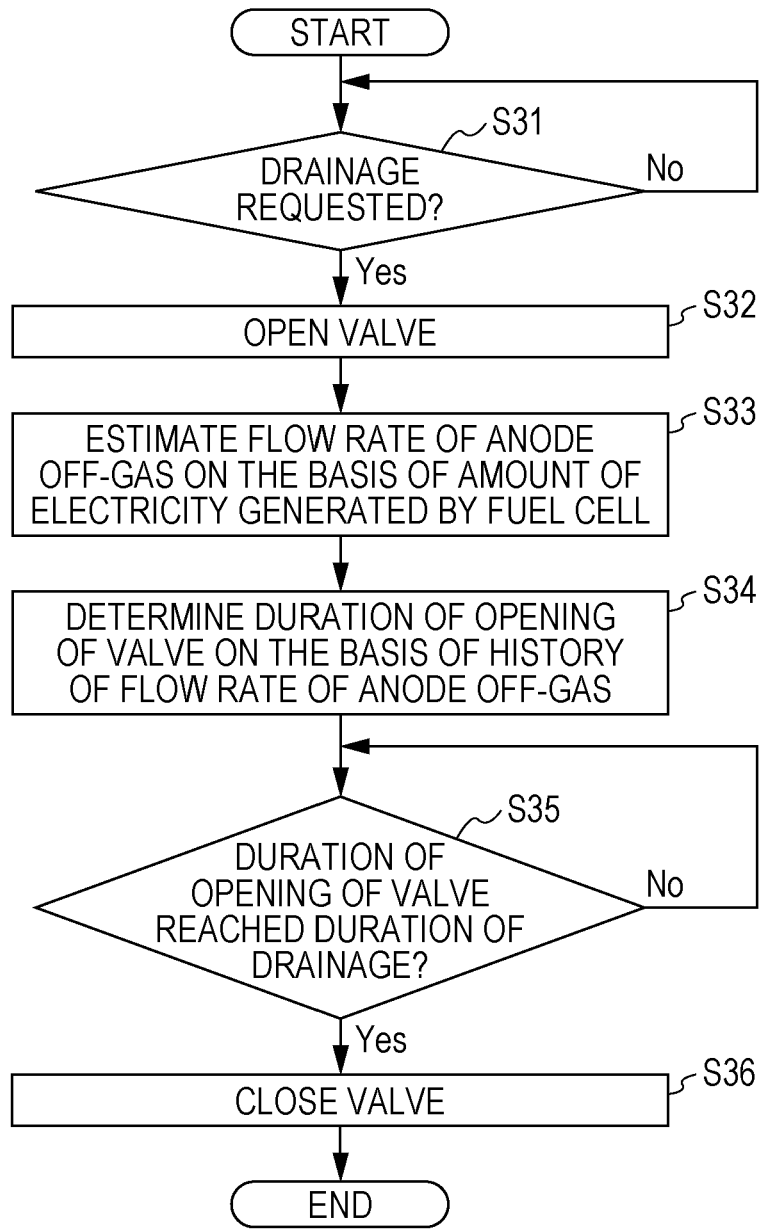
FIG. 5 is a flow chart showing an example of the method for operating the fuel cell system shown in FIG. 1.

A fuel cell system 100 according to Modification 2 of Embodiment 1 is described with reference to FIG. 5. FIG. 5 is a flow chart showing an example of the method for operating the fuel cell system shown in FIG. 1. Since the fuel cell system 100 according to Modification 2 of Embodiment 1 is identical in device configuration to the fuel cell system 100 according to Embodiment 1, a description of the components is omitted.

Operating Method

Since steps S31, S32, and S34 to S36, shown in FIG. 5, of the method for operating the fuel cell system 100 according to Modification 2 of Embodiment 1 are identical to steps S11 to S15 of the method for operating the fuel cell system 100 according to Embodiment 1, respectively, a description of steps S31, S32, and S34 to S36 is omitted and step S33 is described.

The fuel cell system 100 according to Embodiment 1 is configured such that the controller 20 estimates, on the basis of a history of the flow rate of the anode off-gas, the duration of drainage of the water stored in the water reservoir 4. Meanwhile, the fuel cell system 100 according to Modification 2 of Embodiment 1 is configured such that in step S33, the controller 20 estimates the flow rate of the anode off-gas on the basis of the amount of electricity generated by the fuel cell 1. Then, on the basis of a history of the flow rate of the anode off-gas thus estimated, the controller 20 estimates the duration of drainage of the water stored in the water reservoir 4.

That is, the amount of electricity generated by the fuel cell 1 correlates with the flow rate of the fuel gas that is supplied to the anode of the fuel cell 1. For example, an increase in the amount of electricity generated tends to entail an increase in the flow rate of the fuel gas per unit time that is supplied to the anode of the fuel cell 1. Further, the amount of change in the flow rate of the fuel gas correlates with the amount of change in the flow rate of the anode off-gas. For example, an increase in the flow rate of the fuel gas per unit time leads to an increase in the flow rate of the anode off-gas per unit time.

Accordingly, from these correlations, the flow rate of the anode off-gas can be estimated on the basis of the amount of electricity generated by the fuel cell 1. For this reason, the fuel cell system 100 according to Modification 2 of Embodiment 1 makes it possible to grasp the flow rate of the anode off-gas without providing a detector or the like that directly detects the flow rate of the anode off-gas.

Modification 3 of Embodiment 1

Figure 6:
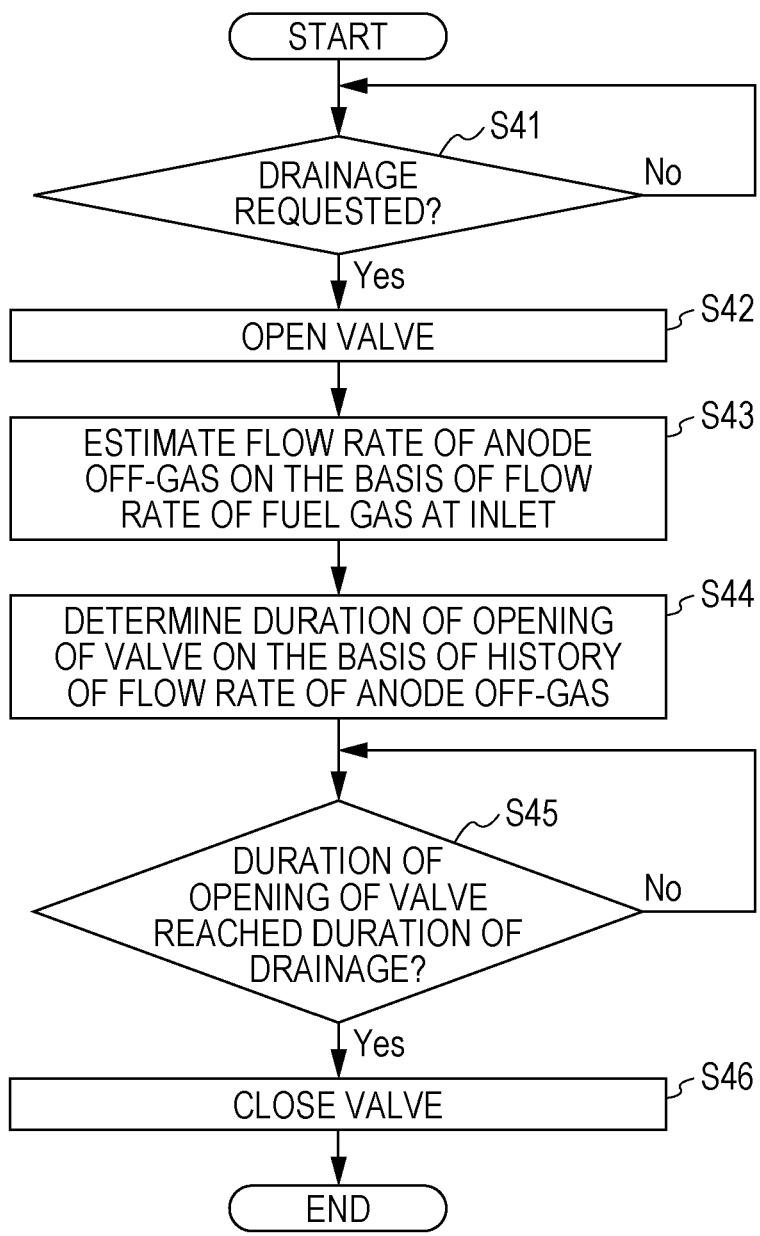
FIG. 6 is a flow chart showing an example of the method for operating the fuel cell system shown in FIG. 1.

A fuel cell system 100 according to Modification 3 of Embodiment 1 is described with reference to FIG. 6. FIG. 6 is a flow chart showing an example of the method for operating the fuel cell system shown in FIG. 1. Since the fuel cell system 100 according to Modification 3 of Embodiment 1 is identical in device configuration to the fuel cell system 100 according to Embodiment 1, a description of the components is omitted.

Operating Method

Since steps S41, S42, and S44 to S46, shown in FIG. 6, of the method for operating the fuel cell system 100 according to Modification 3 of Embodiment 1 are identical to steps S11 to S15 of the method for operating the fuel cell system 100 according to Embodiment 1, respectively, a description of steps S41, S42, and S44 to S46 is omitted and step S43 is described.

That is, the fuel cell system 100 according to Embodiment 1 is configured such that the controller 20 estimates, on the basis of a history of the flow rate of the anode off-gas, the duration of drainage of the water stored in the water reservoir 4. Meanwhile, the fuel cell system 100 according to Modification 3 of Embodiment 1 is configured such that in step S43, the controller 20 estimates the flow rate of the anode off-gas on the basis of the flow rate of the fuel gas at an inlet of the fuel gas supply path 2. Then, on the basis of a history of the flow rate of the anode off-gas thus estimated, the controller 20 estimates the duration of drainage of the water stored in the water reservoir 4.

As mentioned above, the amount of change in the flow rate of the fuel gas at the inlet of the fuel gas supply path 2 correlates with the amount of change in the flow rate of the anode off-gas that is emitted from the fuel cell 1. Accordingly, from this correlation, the flow rate of the anode off-gas can be estimated on the basis of the flow rate of the fuel gas. For this reason, the fuel cell system 100 according to Modification 3 of Embodiment 1 makes it possible to grasp the flow rate of the anode off-gas without providing a detector or the like that directly detects the flow rate of the anode off-gas.

Modification 4 of Embodiment 1

Figure 7:
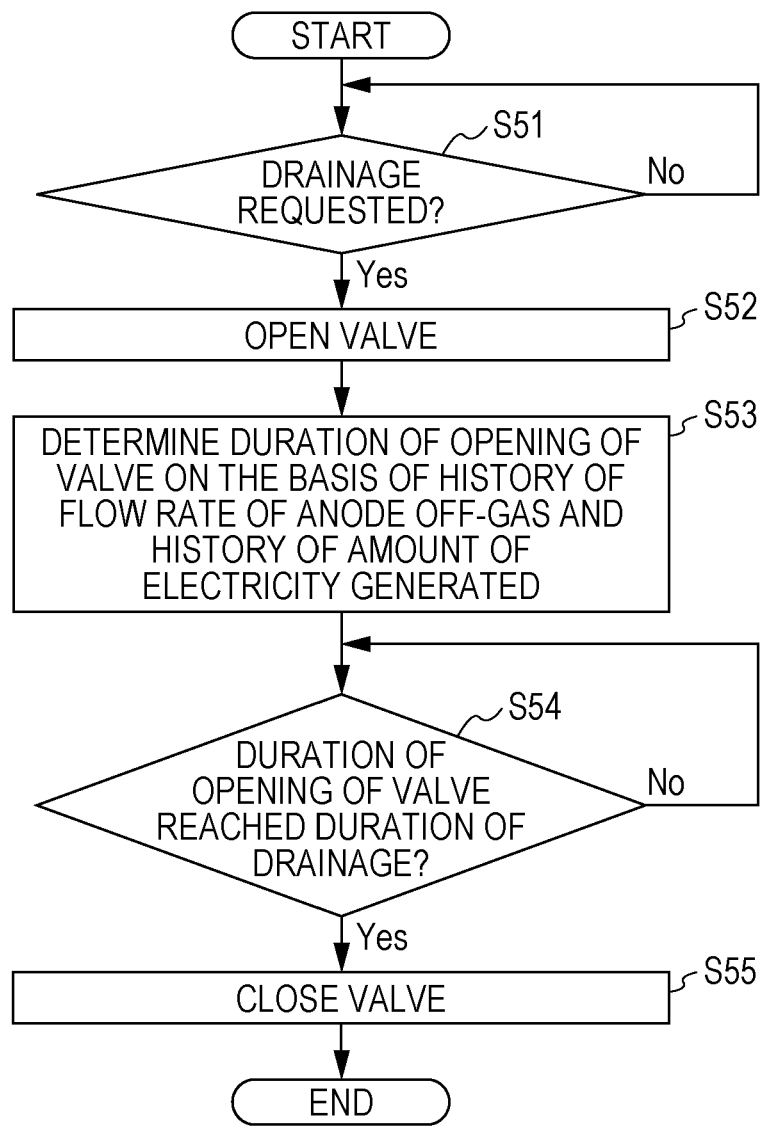
FIG. 7 is a flow chart showing an example of the method for operating the fuel cell system shown in FIG. 1.

A fuel cell system 100 according to Modification 4 of Embodiment 1 is described with reference to FIG. 7. FIG. 7 is a flow chart showing an example of the method for operating the fuel cell system shown in FIG. 1. Since the fuel cell system 100 according to Modification 4 of Embodiment 1 is identical in device configuration to the fuel cell system 100 according to Embodiment 1, a description of the components is omitted.

Operating Method

Since steps S51, S52, S54, and S55, shown in FIG. 7, of the method for operating the fuel cell system 100 according to Modification 4 of Embodiment 1 are identical to steps S11, S12, S14, and S15 of the method for operating the fuel cell system 100 according to Embodiment 1, respectively, a description of steps S51, S52, S54, and S55 is omitted and step S53 is described.

The fuel cell system 100 according to Embodiment 1 is configured such that the controller 20 estimates, on the basis of a history of the flow rate of the anode off-gas, the duration of drainage of the water stored in the water reservoir 4. Meanwhile, the fuel cell system 100 according to Modification 4 of Embodiment 1 is configured such that the controller 20 estimates the duration of drainage of the water stored in the water reservoir 4 in further consideration of a history of the amount of electricity generated by the fuel cell 1 in addition to the history of the flow rate of the anode off-gas.

That is, the generation of electricity by the fuel cell 1 entails the formation of water. Furthermore, an increase or decrease in water thus formed can be considered by considering the history of the amount of electricity generated by the fuel cell 1. Thus, the length of time for which the valve 6 continues to be opened for draining the water stored in the water reservoir 4 can be determined in further consideration of the amount of water that is formed with the generation of electricity by the fuel cell 1. Therefore, the fuel cell system 100 according to Modification 4 of Embodiment 1 makes it possible to more accurately determine the duration of opening of the valve 6 for draining the water stored in the water reservoir 4.

Modification 5 of Embodiment 1

Figure 8:
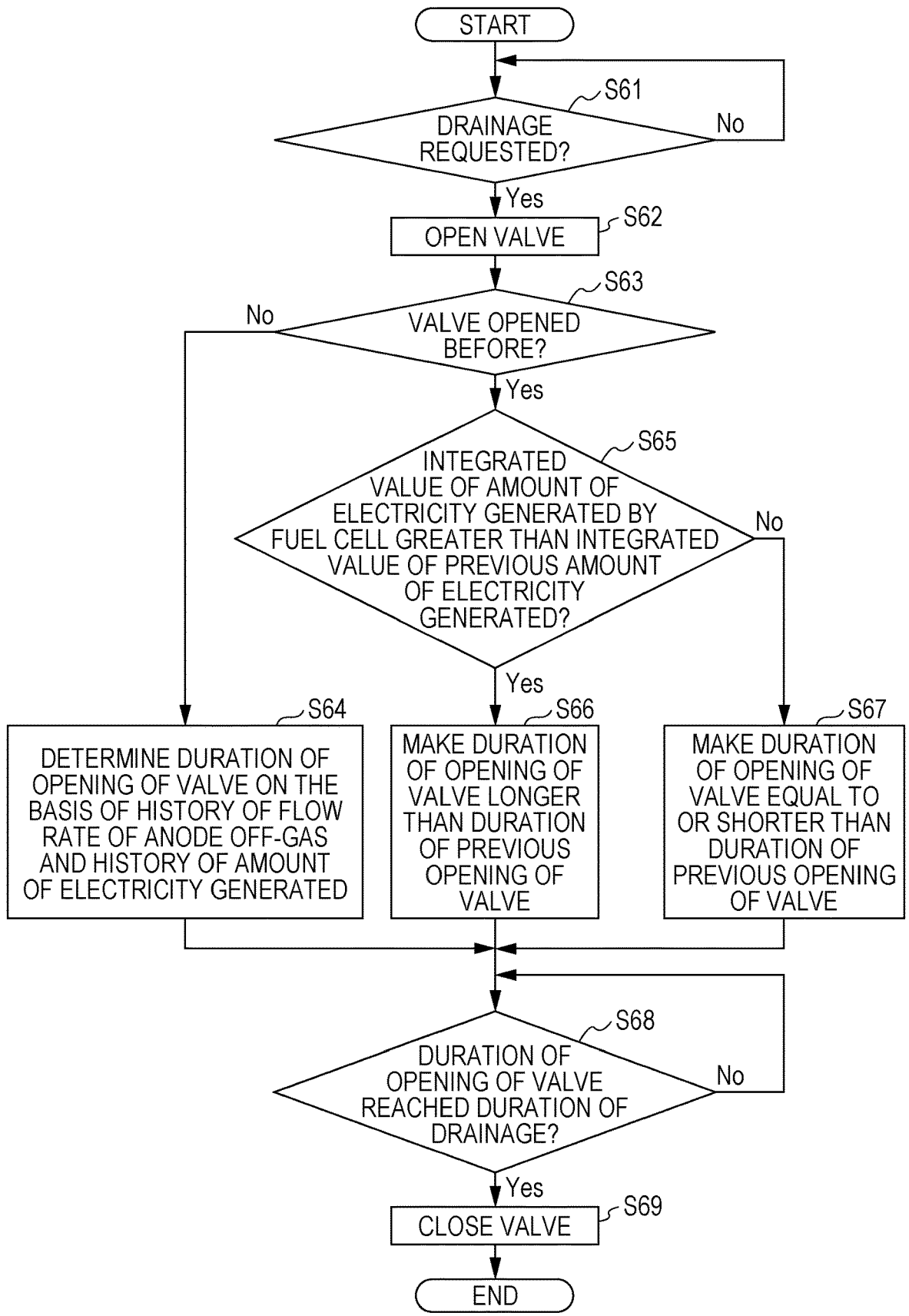
FIG. 8 is a flow chart showing an example of the method for operating the fuel cell system shown in FIG. 1.

A fuel cell system 100 according to Modification 5 of Embodiment 1 is described with reference to FIG. 8. FIG. 8 is a flow chart showing an example of the method for operating the fuel cell system shown in FIG. 1. Since the fuel cell system 100 according to Modification 5 of Embodiment 1 is identical in device configuration to the fuel cell system 100 according to Embodiment 1, a description of the components is omitted.

Operating Method

Since steps S61 to S63, S68, and S69, shown in FIG. 8, of the method for operating the fuel cell system 100 according to Modification 5 of Embodiment 1 are identical to steps S21 to S23, S28, and S29, shown in FIG. 4, of the method for operating the fuel cell system 100 according to Modification 1 of Embodiment 1, respectively, a description of steps S61 to S63, S68, and S69 is omitted.

In step 63 shown in FIG. 8, the controller 20 determines whether it has opened the valve 6 before, and in a case where this is the first time that the controller 20 opens the valve 6 ("No" in step S63), the controller 20 proceeds to step S64. Since step S64 is identical to step S53 shown in FIG. 7, a description of step S64 is omitted.

On the other hand, in a case where the controller 20 has determined that it has opened the valve 6 before ("Yes" in step S63), the controller 20 determines whether an integrated value of the amount of electricity generated (present amount of electricity generated) by the fuel cell 1 during the closing of the valve 6 is greater than an integrated value of the amount of electricity generated (previous amount of electricity generated) by the fuel cell 1 during the closing of the valve 6 prior to the previous opening of the valve 6 (step S65).

In a case where the controller 20 has determined in step S65 that the integrated value of the amount of electricity generated is greater than the integrated value of the previous amount of electricity generated ("Yes" in step S65), the controller 20 makes the duration of opening of the valve 6 longer than the duration of the previous opening (step S66).

Further, in the case of "No" in step S65, i.e. in a case where the integrated value of the amount of electricity generated is equal to or smaller than the integrated value of the previous amount of electricity generated, the controller 20 makes the duration of opening of the valve 6 equal to or shorter than the duration of the previous opening (step S67).

By thus comparing the integrated value of the amount of electricity generated previously calculated with the integrated value of the amount of electricity generated calculated this time, the duration of opening of the valve 6 for draining the water stored in the water reservoir 4 can be easily determined.

Modification 6 of Embodiment 1

Figure 9:
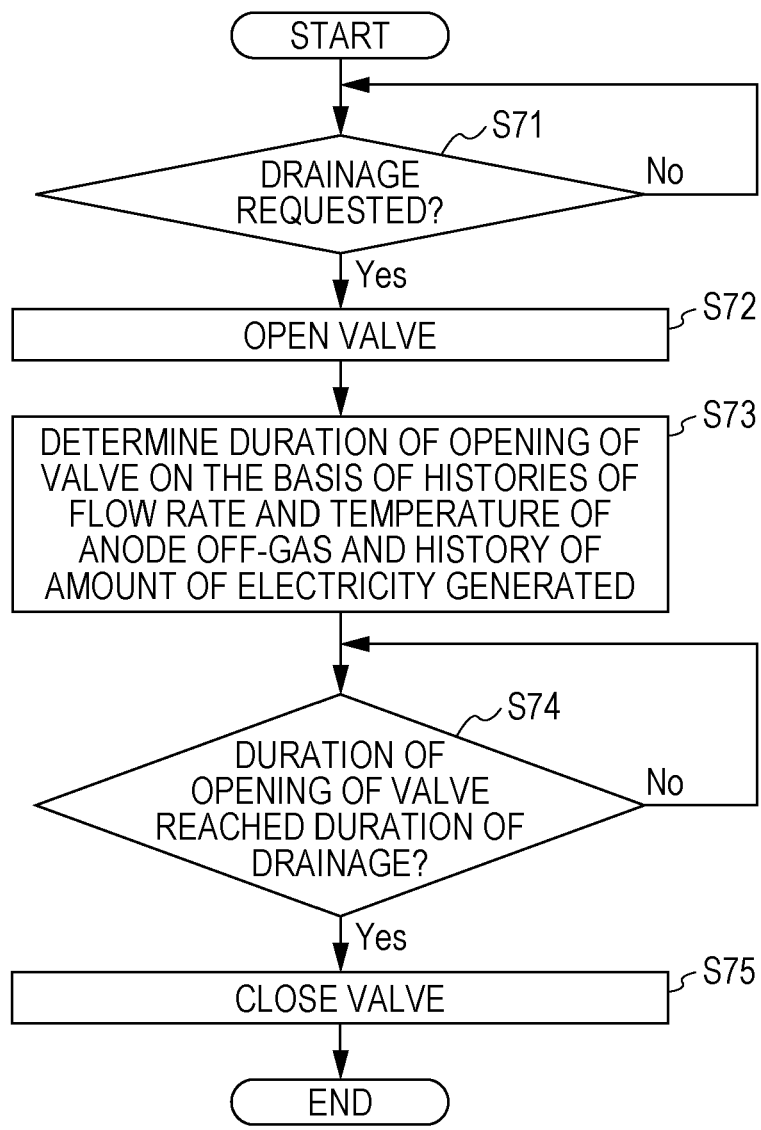
FIG. 9 is a flow chart showing an example of the method for operating the fuel cell system shown in FIG. 1.

A fuel cell system 100 according to Modification 6 of Embodiment 1 is described with reference to FIG. 9. FIG. 9 is a flow chart showing an example of the method for operating the fuel cell system shown in FIG. 1. Since the fuel cell system 100 according to Modification 6 of Embodiment 1 is identical in device configuration to the fuel cell system 100 according to Embodiment 1, a description of the components is omitted.

Operating Method

Since steps S71, S72, S74, and S75, shown in FIG. 9, of the method for operating the fuel cell system 100 according to Modification 6 of Embodiment 1 are identical to steps S51, S52, S54, and S55 of the method for operating the fuel cell system 100 according to Modification 4 of Embodiment 1, respectively, a description of steps S71, S72, S74, and S75 is omitted and step S73 is described.

The fuel cell system 100 according to Modification 4 of Embodiment 1 is configured such that the controller 20 estimates, on the basis of a history of the flow rate of the anode off-gas and a history of the amount of electricity generated by the fuel cell 1, the duration of drainage of the water stored in the water reservoir 4. Meanwhile, the fuel cell system 100 according to Modification 6 of Embodiment 1 is configured such that the controller 20 estimates the duration of drainage of the water stored in the water reservoir 4 in further consideration of a history of the temperature of the anode off-gas in addition to the history of the flow rate of the anode off-gas and the history of the amount of electricity generated by the fuel cell 1.

The temperature of the anode off-gas here may be the temperature of the anode off-gas at an outlet of the fuel cell 1, or may be the temperature of the anode off-gas from which water has been separated by condensation. The outlet of the fuel cell 1 is a part of the recycle gas path 3 through which the anode off-gas is emitted from the fuel cell 1.

Figure 10:
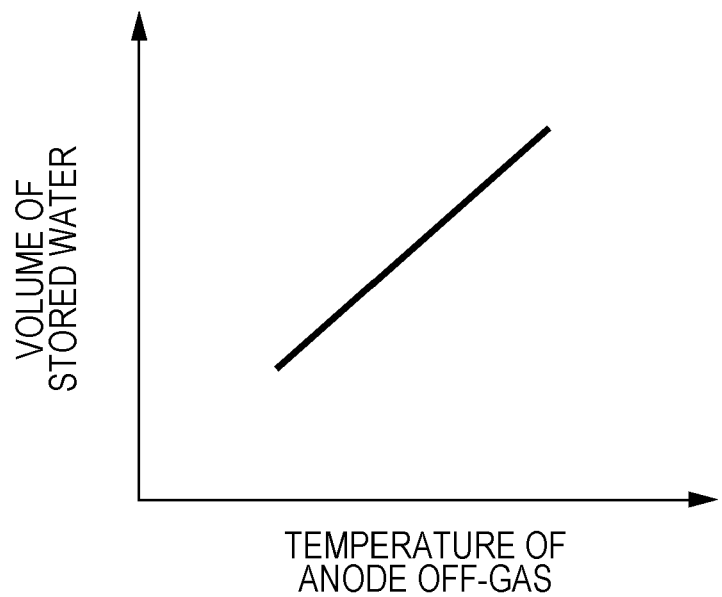
FIG. 10 is a graph showing a general relationship between the volume of stored water in the water reservoir of the fuel cell system according to Embodiment 1 of the present disclosure and the temperature of the anode off-gas at an outlet of a fuel cell.
Figure 11:
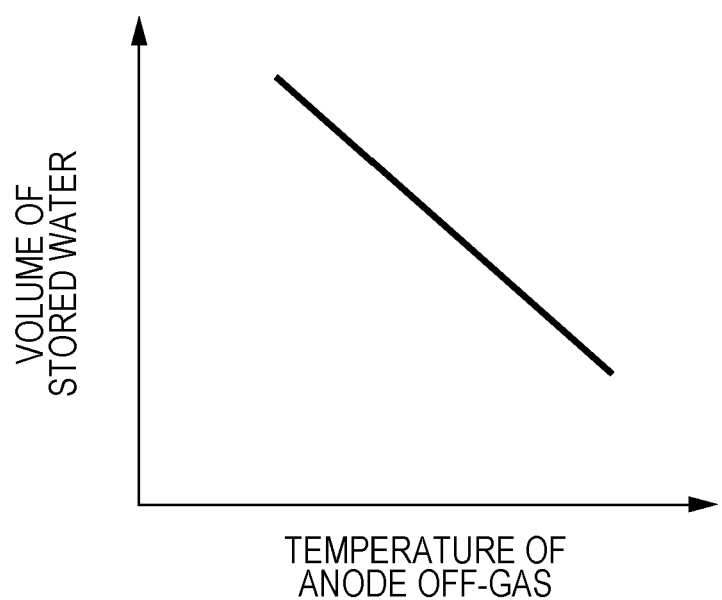
FIG. 11 is a graph showing a general relationship between the volume of stored water in the water reservoir of the fuel cell system according to Embodiment 1 of the present disclosure and the temperature of the anode off-gas from which water has been separated by condensation.

In the case of the former temperature of the anode off-gas, as shown in FIG. 10, such a relationship holds that an increase in temperature of the anode off-gas leads to an increase in the amount of water vapor that is contained in the anode off-gas, and by extension to an increase in the volume of water that is stored in the water reservoir 4. On the other hand, in the case of the latter temperature of the anode off-gas, as shown in FIG. 11, such a relationship holds that a decrease in temperature of the anode off-gas leads to an increase in the volume of water that is separated from the anode off-gas and stored in the water reservoir 4.

FIG. 10 is a graph showing a general relationship between the volume of stored water in the water reservoir 4 of the fuel cell system 100 according to Embodiment 1 of the present disclosure and the temperature of the anode off-gas at the outlet of the fuel cell 1. FIG. 11 is a graph showing a general relationship between the volume of stored water in the water reservoir 4 of the fuel cell system 100 according to Embodiment 1 of the present disclosure and the temperature of the anode off-gas from which water has been separated by condensation. In each of FIGS. 10 and 11, the horizontal axis represents the temperature of the anode off-gas, and the vertical axis represents the volume of stored water in the water reservoir 4. Each of FIGS. 10 and 11 shows a general relationship between the temperature of the anode off-gas and the volume of stored water in the water reservoir 4.

That is, in a case where the temperature of the anode off-gas is the temperature of the anode off-gas at the outlet of the fuel cell 1, the duration of opening of the valve 6 for draining the water stored in the water reservoir 4 can be determined in further consideration of the amount of water vapor that is contained in the anode off-gas. On the other hand, in a case where the temperature of the anode off-gas is the temperature of the anode off-gas from which water has been separated, the duration of opening of the valve 6 for draining the water stored in the water reservoir 4 can be determined in further consideration of the volume of water that is separated from the anode off-gas and stored in the water reservoir 4.

The fuel cell system 100 according to Modification 6 of Embodiment 1 is configured such that the controller 20 estimates the duration of drainage of the water stored in the water reservoir 4 in consideration of a history of the temperature of the anode off-gas in addition to the history of the flow rate of the anode off-gas and the history of the amount of electricity generated by the fuel cell 1. Alternatively, the controller 20 may estimate the duration of drainage from any one of these three parameters, or may estimate the duration of drainage from any combination of these three parameters.

Modification 7 of Embodiment 1

Figure 12:
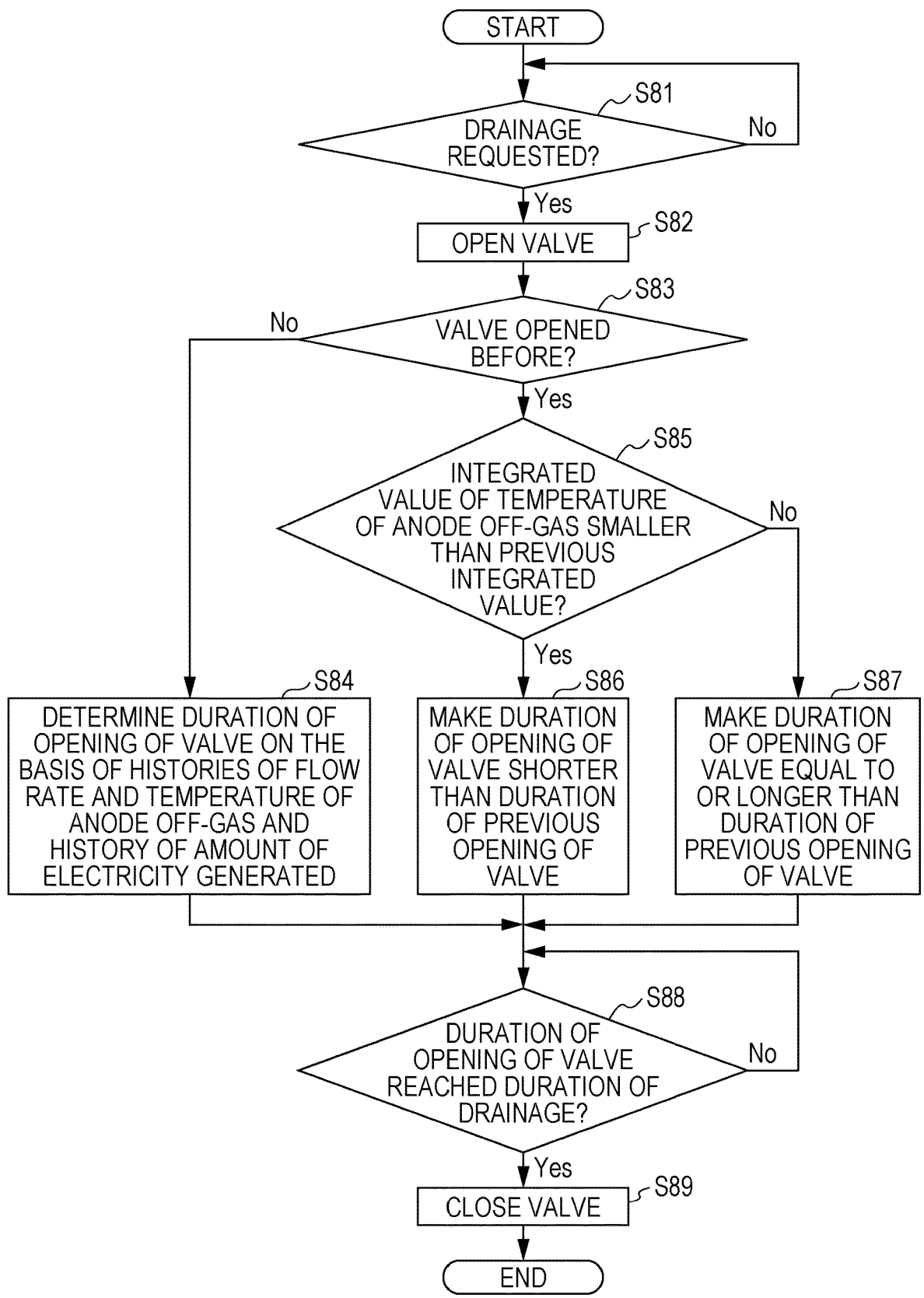
FIG. 12 is a flow chart showing an example of the method for operating the fuel cell system shown in FIG. 1.

A fuel cell system 100 according to Modification 7 of Embodiment 1 is described with reference to FIG. 12. FIG. 12 is a flow chart showing an example of the method for operating the fuel cell system shown in FIG. 1. Since the fuel cell system 100 according to Modification 7 of Embodiment 1 is identical in device configuration to the fuel cell system 100 according to Embodiment 1, a description of the components is omitted.

Operating Method

Since steps S81 to S83, S88, and S89, shown in FIG. 12, of the method for operating the fuel cell system 100 according to Modification 7 of Embodiment 1 are identical to steps S61 to S63, S68, and S69, shown in FIG. 8, of the method for operating the fuel cell system 100 according to Modification 5 of Embodiment 1, respectively, a description of steps S81 to S83, S88, and S89 is omitted.

As shown in FIG. 12, in step 83, the controller 20 determines whether it has opened the valve 6 before, and in a case where this is the first time that the controller 20 opens the valve 6 ("No" in step S83), the controller 20 proceeds to step S84. Since step S84 is identical to step S73 shown in FIG. 9, a description of step S84 is omitted. In Modification 7 of Embodiment 1, the temperature of the anode off-gas is the temperature of the anode off-gas at the outlet of the fuel cell 1.

On the other hand, in a case where the controller 20 has determined that it has opened the valve 6 before ("Yes" in step S83), the controller 20 determines whether an integrated value of the temperature of the anode off-gas during the closing of the valve 6 is greater than an integrated value of the temperature of the anode off-gas during the closing of the valve 6 prior to the previous opening of the valve 6 (step S85).

In a case where the controller 20 has determined in step S85 that the integrated value of the temperature of the anode off-gas is greater than the integrated value of the previous temperature of the anode off-gas ("Yes" in step S85), the controller 20 makes the duration of opening of the valve 6 for draining the water stored in the water reservoir 4 longer than the duration of the previous opening (step S86).

Further, in the case of "No" in step S85, i.e. in a case where the integrated value of the temperature of the anode off-gas is equal to or smaller than the integrated value of the previous temperature of the anode off-gas, the controller 20 makes the duration of opening of the valve 6 for draining the water stored in the water reservoir 4 equal to or longer than the duration of the previous opening (step S87).

By thus comparing the integrated value of the temperature of the anode off-gas previously calculated with the integrated value of the temperature of the anode off-gas calculated this time, the duration of opening of the valve 6 for draining the water stored in the water reservoir 4 can be easily determined.

The controller 20 may be configured to estimate the temperature of the anode off-gas at the outlet of the fuel cell 1 in the following manner.

That is, the controller 20 may be configured to estimate the temperature of the anode off-gas on the basis of the amount of electricity generated by the fuel cell 1. Alternatively, the controller 20 may be configured to estimate the temperature of the anode off-gas on the basis of the temperature of the fuel gas at the inlet of the fuel gas supply path 2.

Modification 8 of Embodiment 1

Figure 13:
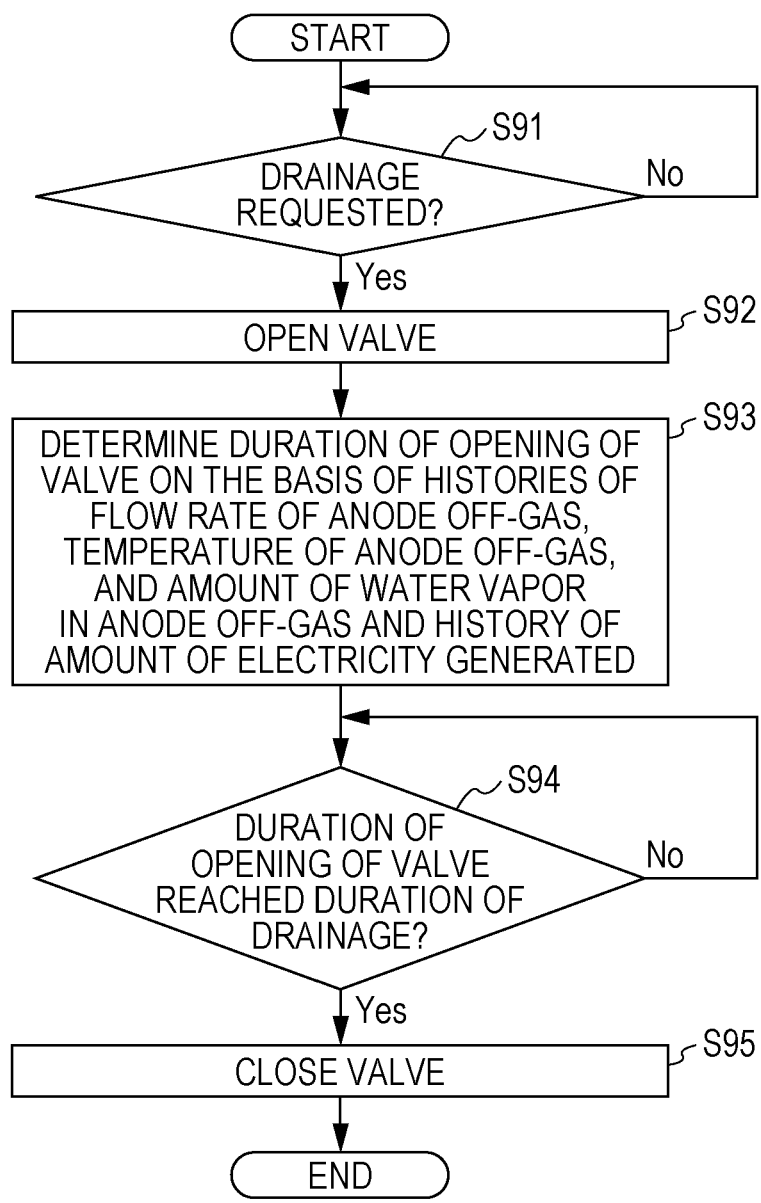
FIG. 13 is a flow chart showing an example of the method for operating the fuel cell system shown in FIG. 1.

A fuel cell system 100 according to Modification 8 of Embodiment 1 is described with reference to FIG. 13. FIG. 13 is a flow chart showing an example of the method for operating the fuel cell system shown in FIG. 1. Since the fuel cell system 100 according to Modification 8 of Embodiment 1 is identical in device configuration to the fuel cell system 100 according to Embodiment 1, a description of the components is omitted.

Operating Method

Since steps S91, S92, S94, and S95, shown in FIG. 13, of the method for operating the fuel cell system 100 according to Modification 8 of Embodiment 1 are identical to steps S71, S72, S74, and S75, shown in FIG. 9, of the method for operating the fuel cell system 100 according to Modification 6 of Embodiment 1, respectively, a description of steps S91, S92, S94, and S95 is omitted and step S93 is described.

The fuel cell system 100 according to Modification 6 of Embodiment 1 is configured such that the controller 20 estimates, on the basis of histories of the flow rate and temperature of the anode off-gas and a history of the amount of electricity generated by the fuel cell 1, the duration of drainage of the water stored in the water reservoir 4. Meanwhile, the fuel cell system 100 according to Modification 8 of Embodiment 1 is configured such that the controller 20 estimates the duration of drainage of the water stored in the water reservoir 4 in further consideration of a history of the amount of water vapor that is contained in the anode off-gas in addition to the histories of the flow rate and temperature of the anode off-gas and the history of the amount of electricity generated by the fuel cell 1.

The temperature of the anode off-gas here may be the temperature of the anode off-gas at the outlet of the fuel cell 1, or may be the temperature of the anode off-gas from which water has been separated by condensation.

Note here that the amount of water vapor that is contained in the anode off-gas correlates with the volume of water that is formed by condensation. That is, the amount of water vapor that is contained in the anode off-gas correlates with the volume of water that is stored in the water reservoir 4. In the fuel cell system 100 according to Modification 8 of Embodiment 1, further consideration of the amount of water vapor that is contained in the anode off-gas allows the controller 20 to more accurately determine the duration of opening of the valve 6 for draining the water stored in the water reservoir 4.

The fuel cell system 100 according to Modification 8 of Embodiment 1 is configured such that the controller 20 estimates the duration of drainage of the water stored in the water reservoir 4 in further consideration of a history of the amount of water vapor that is contained in the anode off-gas in addition to the histories of the flow rate and temperature of the anode off-gas and the history of the amount of electricity generated by the fuel cell 1. Alternatively, the controller 20 may estimate the duration of drainage from any one of these four parameters, or may estimate the duration of drainage from any combination of these four parameters.

Modification 9 of Embodiment 1

Figure 14:
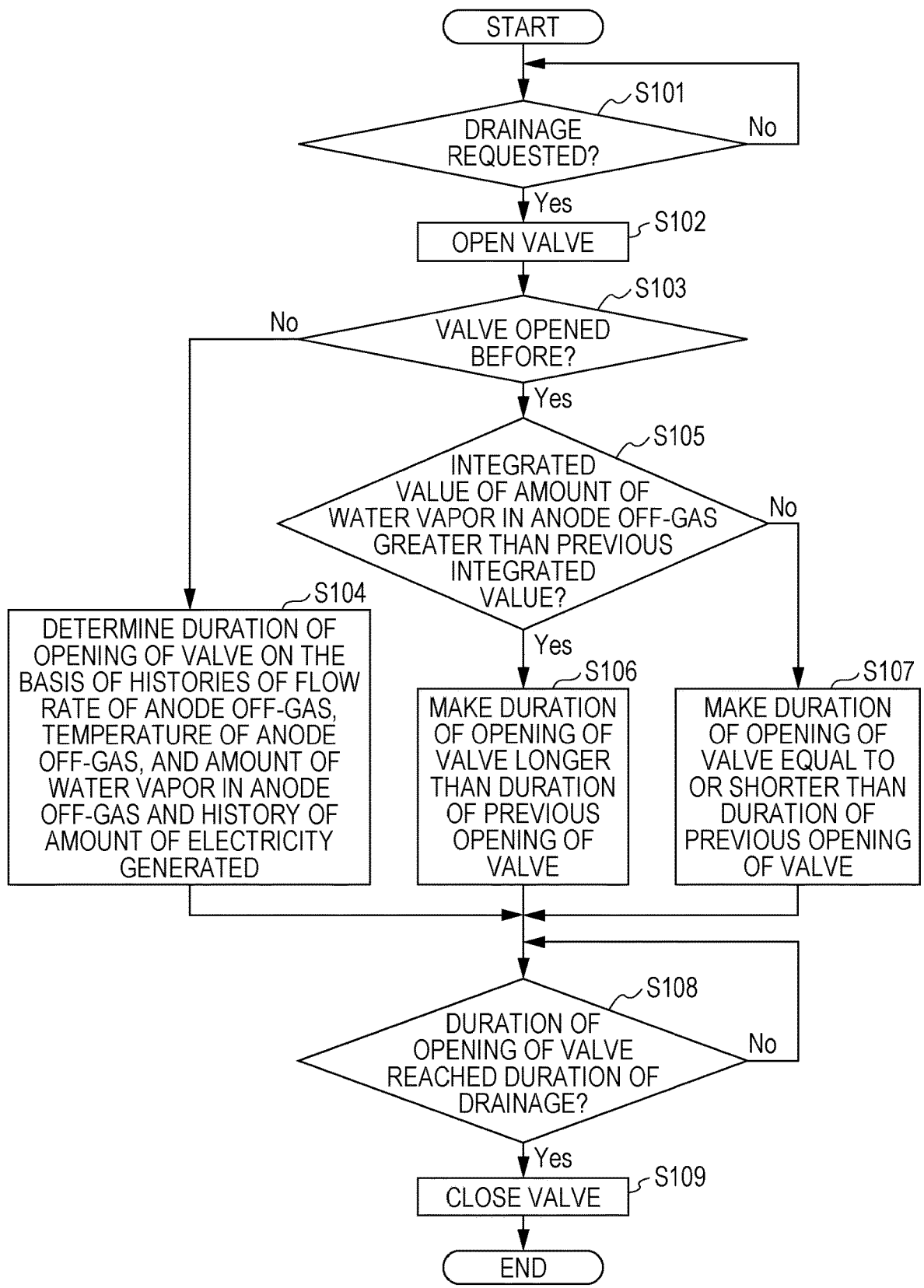
FIG. 14 is a flow chart showing an example of the method for operating the fuel cell system shown in FIG. 1.

A fuel cell system 100 according to Modification 9 of Embodiment 1 is described with reference to FIG. 14. FIG. 14 is a flow chart showing an example of the method for operating the fuel cell system shown in FIG. 1. Since the fuel cell system 100 according to Modification 9 of Embodiment 1 is identical in device configuration to the fuel cell system 100 according to Embodiment 1, a description of the components is omitted.

Operating Method

Since steps S101 to S103, S108, and S109, shown in FIG. 14, of the method for operating the fuel cell system 100 according to Modification 9 of Embodiment 1 are identical to steps S81 to S83, S88, and S89, shown in FIG. 12, of the method for operating the fuel cell system 100 according to Modification 7 of Embodiment 1, respectively, a description of steps S101 to S103, S108, and S109 is omitted.

As shown in FIG. 14, in step 103, the controller 20 determines whether it has opened the valve 6 before, and in a case where this is the first time that the controller 20 opens the valve 6 ("No" in step S103), the controller 20 proceeds to step S104. Since step S104 is identical to step S93 shown in FIG. 13, a description of step S104 is omitted. In Modification 9 of Embodiment 1, the temperature of the anode off-gas may be the temperature of the anode off-gas at the outlet of the fuel cell 1, or may be the temperature of the anode off-gas from which water has been separated by condensation.

On the other hand, in a case where the controller 20 has determined that it has opened the valve 6 before ("Yes" in step S103), the controller 20 determines whether an integrated value of the amount of water vapor that is contained in the anode off-gas during the closing of the valve 6 is greater than an integrated value of the amount of water vapor that is contained in the anode off-gas (previous amount of water vapor that is contained in the anode off-gas) during the closing of the valve 6 prior to the previous opening of the valve 6 (step S105).

In a case where the controller 20 has determined in step S105 that the integrated value of the amount of water vapor that is contained in the anode off-gas is greater than the integrated value of the previous amount of water vapor that is contained in the anode off-gas ("Yes" in step S105), the controller 20 makes the duration of opening of the valve 6 for draining the water stored in the water reservoir 4 longer than the duration of the previous opening (step S106).

Further, in the case of "No" in step S105, i.e. in a case where the integrated value of the amount of water vapor that is contained in the anode off-gas is equal to or smaller than the integrated value of the previous amount of water vapor that is contained in the anode off-gas, the controller 20 makes the duration of opening of the valve 6 for draining the water stored in the water reservoir 4 equal to or shorter than the duration of the previous opening (step S107).

By thus comparing the integrated value of the previous amount of water vapor that is contained in the anode off-gas with the integrated value of the present amount of water vapor that is contained in the anode off-gas, the duration of opening of the valve 6 for draining the water stored in the water reservoir 4 can be easily determined.

The controller 20 may be configured to estimate the amount of water vapor that is contained in the anode off-gas in the following manner. That is, the controller 20 may estimate the amount of water vapor in the anode off-gas on the basis of the amount of electricity generated by the fuel cell 1. That is, the amount of electricity generated by the fuel cell 1 correlates with the temperature of the anode off-gas at the outlet of the fuel cell 1. Further, in a case where the fuel cell 1 is operating under fully humidified conditions, the amount of water vapor that is contained in the anode off-gas can be estimated from the temperature of the anode off-gas at the outlet of the fuel cell 1. For this reason, the controller 20 makes it possible to estimate the amount of water vapor that is contained in the anode off-gas on the basis of the amount of electricity generated by the fuel cell 1, for example, without providing a humidity sensor that detects the amount of water vapor.

Alternatively, the amount of water vapor that is contained in the anode off-gas may be estimated on the basis of the amount of water vapor in the fuel gas at the inlet of the fuel gas supply path 2. That is, the amount of water vapor that is contained in the fuel gas at the inlet of the fuel gas supply path 2 correlates with the amount of water vapor that is contained in the anode off-gas. Further, in a case where the fuel cell 1 is operating under fully humidified conditions, the amount of water vapor that is contained in the fuel gas can be estimated from the temperature of the fuel gas.

For this reason, the controller 20 makes it possible to estimate the amount of water vapor that is contained in the fuel gas, for example, without providing a humidity sensor that detects the amount of water vapor and, on the basis of the amount of water vapor that is contained in the fuel gas thus estimated, estimate the amount of water vapor that is contained in the anode off-gas.

Modification 10 of Embodiment 1

Figure 15:
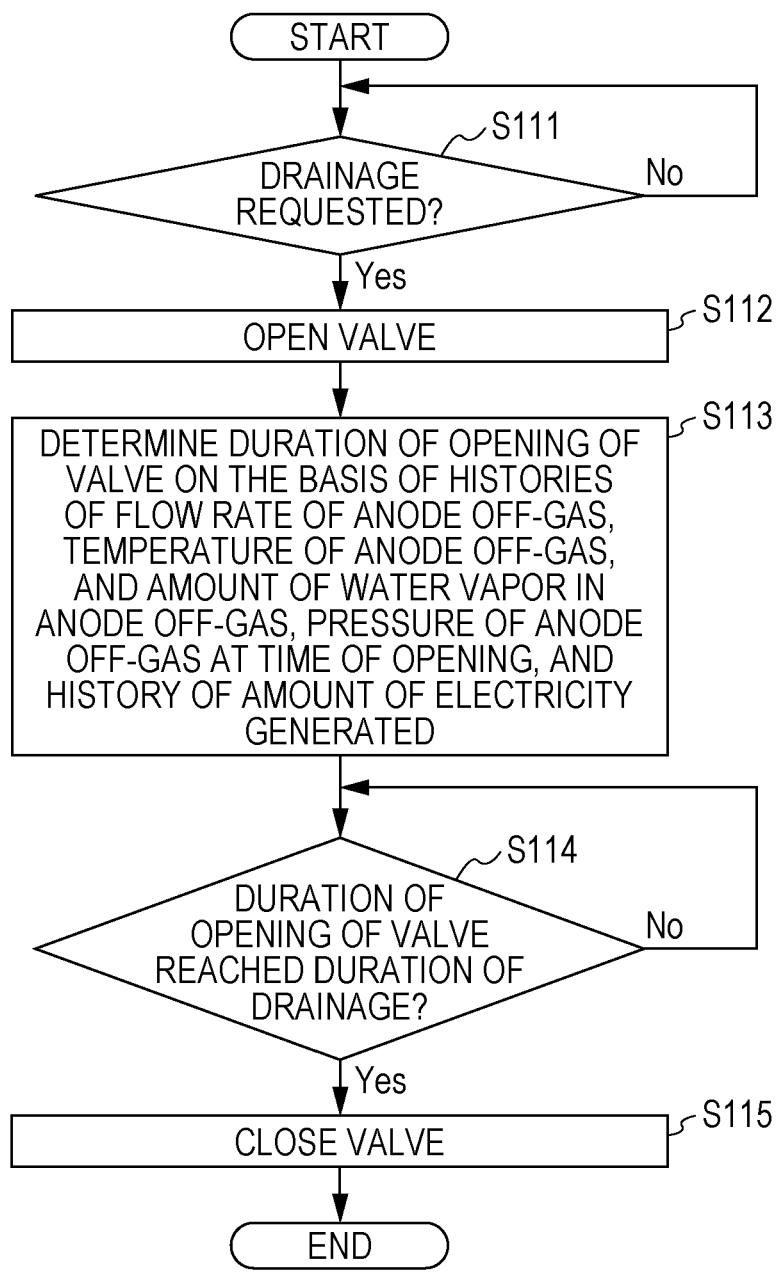
FIG. 15 is a flow chart showing an example of the method for operating the fuel cell system shown in FIG. 1.

A fuel cell system 100 according to Modification 10 of Embodiment 1 is described with reference to FIG. 15. FIG. 15 is a flow chart showing an example of the method for operating the fuel cell system shown in FIG. 1. Since the fuel cell system 100 according to Modification 10 of Embodiment 1 is identical in device configuration to the fuel cell system 100 according to Embodiment 1, a description of the components is omitted.

Operating Method

Since steps S111, S112, S114, and S115, shown in FIG. 15, of the method for operating the fuel cell system 100 according to Modification 10 of Embodiment 1 are identical to steps S91, S92, S94, and S95, shown in FIG. 13, of the method for operating the fuel cell system 100 according to Modification 8 of Embodiment 1, respectively, a description of steps S111, S112, S114, and S115 is omitted and step S113 is described.

The fuel cell system 100 according to Modification 8 of Embodiment 1 is configured such that the controller 20 estimates, on the basis of histories of the flow rate of the anode off-gas, the temperature of the anode off-gas, and the amount of water vapor in the anode off-gas and a history of the amount of electricity generated by the fuel cell 1, the duration of drainage of the water stored in the water reservoir 4. Meanwhile, the fuel cell system 100 according to Modification 10 of Embodiment 1 is configured such that the controller 20 estimates the duration of drainage of the water stored in the water reservoir 4 in further consideration of the pressure of the anode off-gas at the time of opening of the valve 6 in addition to the histories of the flow rate of the anode off-gas, the temperature of the anode off-gas, and the amount of water vapor in the anode off-gas and the history of the amount of electricity generated by the fuel cell 1.

Figure 16:
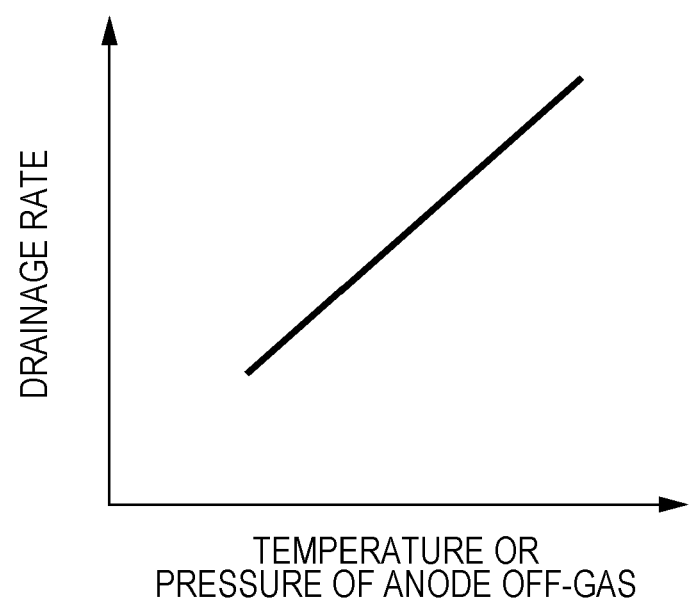
FIG. 16 is a graph showing a general relationship between the drainage rate of water that is drained from a first drainage path in the fuel cell system according to Embodiment 1 of the present disclosure and the pressure or temperature of the anode off-gas.

Note here that, as shown in FIG. 16, the magnitude of the pressure of the anode off-gas correlates with the drainage rate of water from the water reservoir 4. That is, an increase in pressure of the anode off-gas leads to an increase in the drainage rate of water from the water reservoir 4. This makes it possible to estimate the drainage rate of water from the reservoir 4 from the pressure of the anode off-gas.

FIG. 16 is a graph showing a general relationship between the drainage rate of water that is drained from the first drainage path 5 in the fuel cell system 100 according to Embodiment 1 of the present disclosure and the pressure or temperature of the anode off-gas. In FIG. 16, the vertical axis represents the velocity of flow of water at which the water stored in the water reservoir 4 is drained through the first drainage path 5, and the horizontal axis represents the pressure or temperature of the anode off-gas. FIG. 16 shows a general relationship between the velocity of flow of water at which the water stored in the water reservoir 4 is drained through the first drainage path 5 and the pressure or temperature of the anode off-gas.

As shown in FIG. 16, the drainage rate reaches its minimum when the pressure of the anode off-gas is at its minimum, and conversely, the drainage rate reaches its maximum when the pressure of the anode off-gas is at its maximum.

In the fuel cell system 100 according to Modification 10 of Embodiment 1, further consideration of the pressure of the anode off-gas at the time of opening of the valve 6 allows the controller 20 to determine, in further consideration of the drainage rate of water from the water reservoir 4 in addition to the volume of water stored in the water reservoir 4, the length of time for which the valve 6 continues to be opened for draining the water stored in the water reservoir 4. This allows the controller 20 to more accurately determine the duration of opening of the valve 6 for draining the water stored in the water reservoir 4.

The fuel cell system 100 according to Modification 10 of Embodiment 1 is configured such that the controller 20 estimates the duration of drainage of the water stored in the water reservoir 4 in further consideration of the pressure of the anode off-gas at the time of opening of the valve 6 in addition to the histories of the flow rate of the anode off-gas, the temperature of the anode off-gas, and the amount of water vapor in the anode off-gas and the history of the amount of electricity generated by the fuel cell 1. Alternatively, the controller 20 may estimate the duration of drainage from any one of these five parameters, or may estimate the duration of drainage from any combination of these five parameters.

Modification 11 of Embodiment 1

Figure 17:
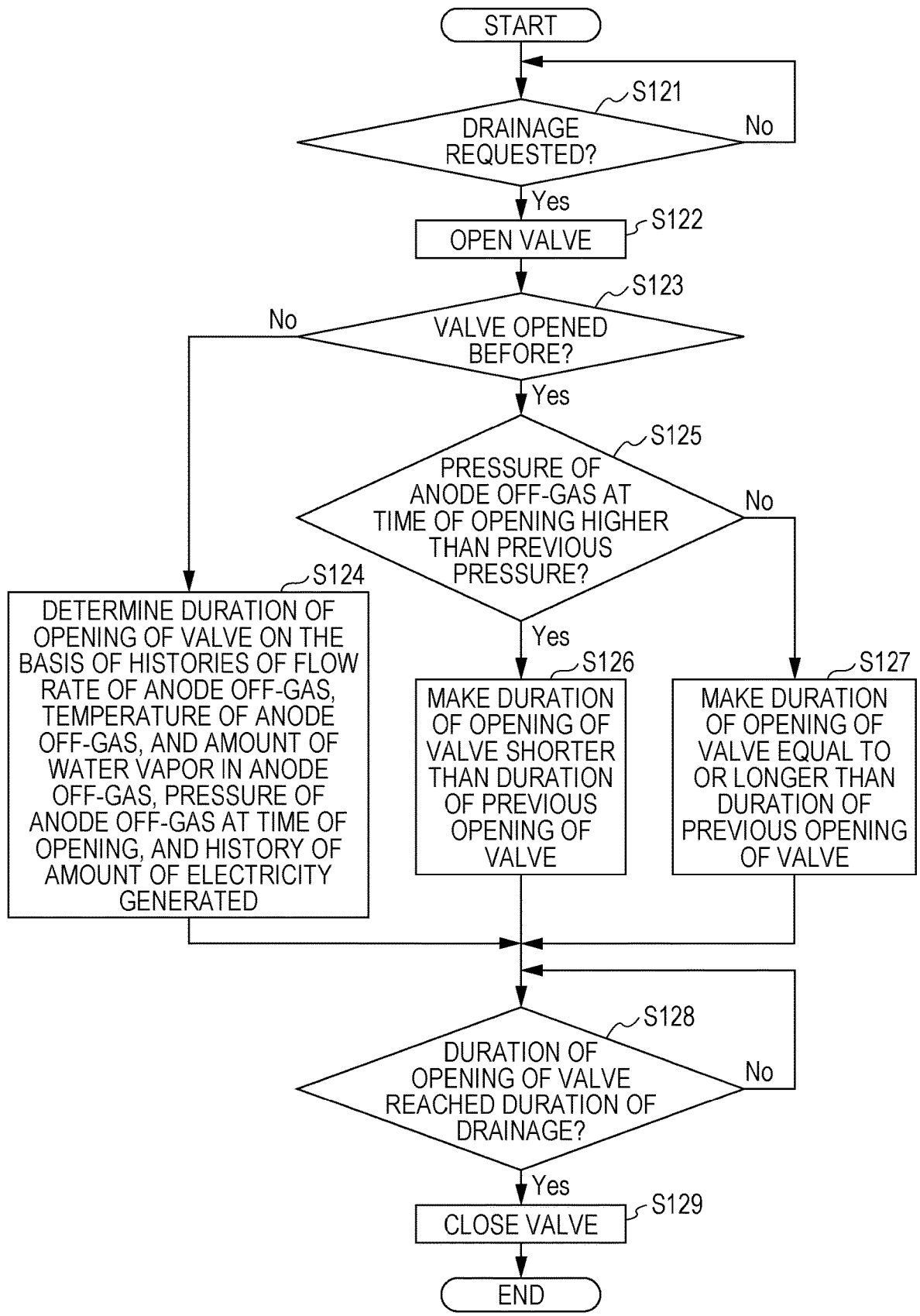
FIG. 17 is a flow chart showing an example of the method for operating the fuel cell system shown in FIG. 1.

A fuel cell system 100 according to Modification 11 of Embodiment 1 is described with reference to FIG. 17. FIG. 17 is a flow chart showing an example of the method for operating the fuel cell system shown in FIG. 1. Since the fuel cell system 100 according to Modification 11 of Embodiment 1 is identical in device configuration to the fuel cell system 100 according to Embodiment 1, a description of the components is omitted.

Operating Method

Since steps S121 to S123, S128, and S129, shown in FIG. 17, of the method for operating the fuel cell system 100 according to Modification 11 of Embodiment 1 are identical to steps S101 to S103, S108, and S109, shown in FIG. 14, of the method for operating the fuel cell system 100 according to Modification 7 of Embodiment 1, respectively, a description of steps S121 to S123, S128, and S129 is omitted.

As shown in FIG. 17, in step 123, the controller 20 determines whether it has opened the valve 6 before, and in a case where this is the first time that the controller 20 opens the valve 6 ("No" in step S123), the controller 20 proceeds to step S124. Since step S124 is identical to step S113 shown in FIG. 15, a description of step S124 is omitted. In Modification 11 of Embodiment 1, the temperature of the anode off-gas may be the temperature of the anode off-gas at the outlet of the fuel cell 1, or may be the temperature of the anode off-gas from which water has been separated by condensation.

On the other hand, in a case where the controller 20 has determined that it has opened the valve 6 before ("Yes" in step S123), the controller 20 determines whether the pressure of the anode off-gas at the time of opening of the valve 6 is higher than the pressure of the anode off-gas at the time of previous opening of the valve 6 (step S125).

In a case where the controller 20 has determined in step S125 that the pressure of the anode off-gas at the time of opening of the valve 6 is higher than the pressure of the anode off-gas at the time of previous opening of the valve 6 ("Yes" in step S125), the controller 20 makes the duration of opening of the valve 6 for draining the water stored in the water reservoir 4 shorter than the duration of the previous opening (step S126).

Further, in the case of "No" in step S125, i.e. in a case where the pressure of the anode off-gas at the time of opening of the valve 6 is equal to or lower than the previous pressure of the anode off-gas, the controller 20 makes the duration of opening of the valve 6 for draining the water stored in the water reservoir 4 equal to or longer than the duration of the previous opening (step S127).

By thus comparing the previous pressure of the anode off-gas at the time of opening of the valve 6 with the present pressure of the anode off-gas, the duration of opening of the valve 6 for draining the water stored in the water reservoir 4 can be easily determined.

The controller 20 may be configured to estimate the pressure of the anode off-gas in the following manner. That is, the controller 20 may estimate the pressure of the anode off-gas on the basis of the amount of electricity generated by the fuel cell 1. In a case where the fuel gas is being supplied to the fuel cell 1 at a constant pressure through the fuel gas supply path 2, the pressure of the anode off-gas that is emitted from the fuel cell 1 varies according to the amount of electricity generated by the fuel cell 1. Accordingly, through the utilization of this correlation between the amount of electricity generated by the fuel cell 1 and the pressure of the anode off-gas, the pressure of the anode off-gas is estimated from the amount of electricity generated by the fuel cell 1.

For this reason, the controller 20 makes it possible to estimate the pressure of the anode off-gas on the basis of the amount of electricity generated by the fuel cell 1, for example, without providing a pressure sensor that detects the pressure of the anode off-gas.

Embodiment 2

Figure 18:
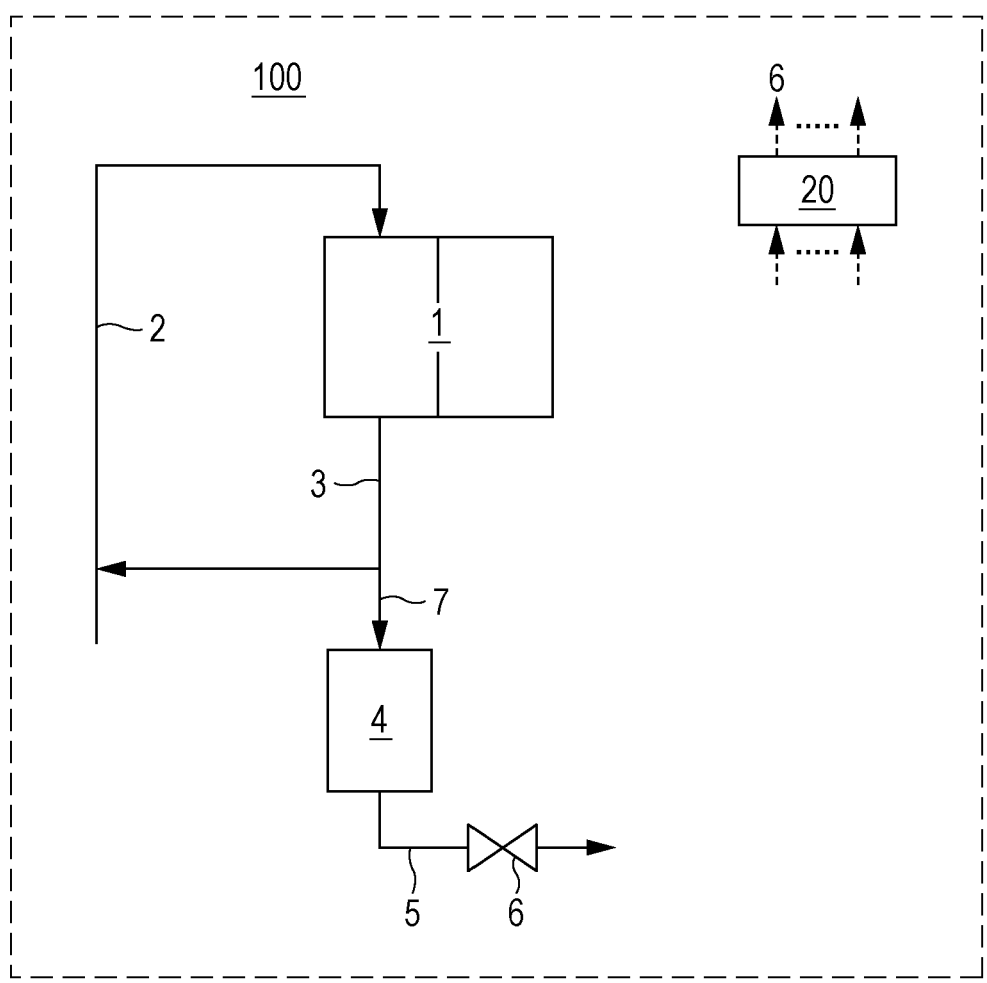
FIG. 18 is a block diagram schematically showing an example of a configuration of the main components of a fuel cell system according to Embodiment 2 of the present disclosure.

A fuel cell system 100 according to Embodiment 2 is described with reference to FIG. 18. FIG. 18 is a block diagram schematically showing an example of a configuration of the main components of the fuel cell system 100 according to Embodiment 2 of the present disclosure.

As shown in FIG. 18, the fuel cell system 100 according to Embodiment 2 is different from the fuel cell system 100 according to Embodiment 1 in terms of further including a second drainage path 7 that branches off from the recycle gas path 3 but, in other respects, is identical in configuration to the fuel cell system 100 according to Embodiment 1. Components of the fuel cell system 100 according to Embodiment 2 which are identical to those of the fuel cell system 100 according to Embodiment 1 are not described here.

That is, as shown in FIG. 18, the fuel cell system 100 according to Embodiment 2 as compared with the fuel cell system 100 according to Embodiment 1 is configured to further include the second drainage path 7, connected to the water reservoir 4, which branches off from the recycle gas path 3.

The fuel cell system 100 according to Embodiment 2 is configured such that condensed water condensed from an anode off-gas flowing through the recycle gas path 3 is guided into the water reservoir 4 through the second drainage path 7. Then, the condensed water stored in the water reservoir 4 is drained out of the system via the first drainage path 5. The second drainage path 7 may be constituted, for example, by a pipe, a joint, and the like.

By thus including the second drainage path 7, the fuel cell system 100 according to Embodiment 2 makes it possible to freely design a relative positional relationship between the recycle gas path 3 and the water reservoir 4 and therefore makes it possible to improve the degree of freedom of internal design of the fuel cell system 100. Further, the improvement in the degree of freedom of design makes it possible to make the fuel cell system 100 smaller in size.

Embodiment 3

A fuel cell system 100 according to Embodiment 3 is identical in configuration to the fuel cell system 100 according to Embodiment 1 shown in FIG. 1, except that the fuel cell system 100 according to Embodiment 3 is configured such that the first drainage path 5 drains condensed water contained in the water reservoir 4 and emits an anode off-gas. Moreover, the fuel cell system 100 according to Embodiment 3 performs drainage of the condensed water and emission of the anode off-gas through a sequence of actions shown in FIG. 19 below.

Operating Method

Figure 19:
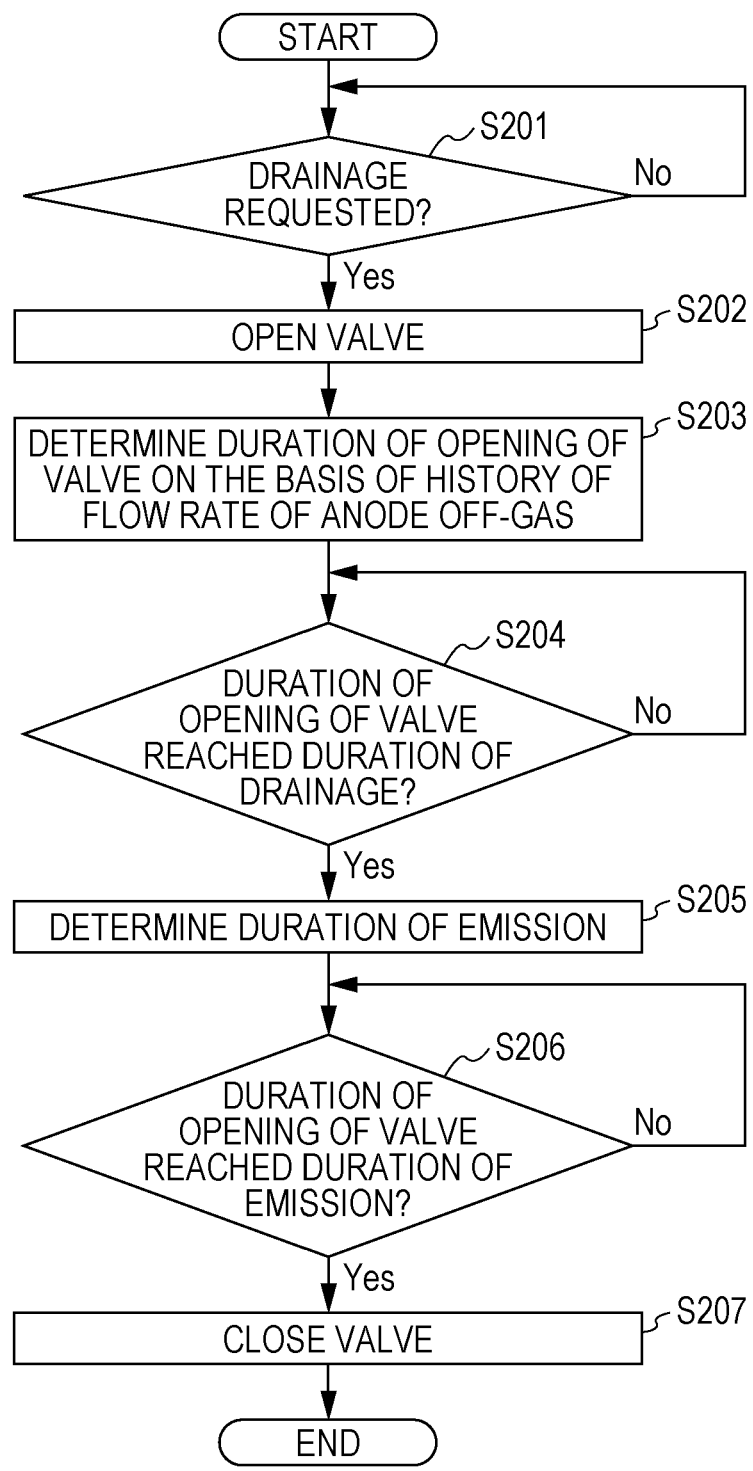
FIG. 19 is a flow chart showing an example of a method for operating the fuel cell system according to Embodiment 3.

FIG. 19 is a flow chart showing an example of a method for operating the fuel cell system 100 according to Embodiment 3. Since steps S201 to S204 of the operating method shown in FIG. 19 are identical to steps S11 to S14 of the operating method shown in FIG. 2, respectively, a description of steps S201 to S204 is omitted.

If the controller 20 determines in step S204 that the duration of opening of the valve 6 has reached the duration of drainage ("Yes" in step S204), then the controller 20 determines the duration of emission of the anode off-gas (step S205). At this point of time, the duration of emission of the anode off-gas may be calculated on the basis of an amount of emission of the anode off-gas, or may be determined on the basis of another method. As such another method, it is possible, for example, to determine the duration of emission as a predetermined length of time in advance. On the other hand, while the controller 20 determines in step S204 that the duration of opening of the valve 6 has not reached the duration of drainage ("No" in step S204), the controller 20 repeatedly exercises control to determine whether the duration of opening of the valve 6 has reached the duration of drainage.

Furthermore, the controller 20 determines whether the period of time having elapsed since the valve 6 was opened in S202 has reached the duration of emission of the anode off-gas thus determined (step S206). Then, in a case where the controller 20 has determined that the period of time having elapsed since the valve 6 was opened has reached the duration of emission of the anode off-gas thus determined ("Yes" in step S206), the controller 20 determines that the emission of the anode off-gas is complete, and exercises control to close the valve 6 (step S207). On the other hand, while the controller 20 determines that the period of time having elapsed since the valve 6 was opened has not reached the duration of emission of the anode off-gas thus determined ("No" in step S206), the controller 20 repeatedly exercises control to determine whether the period of time having elapsed since the valve 6 was opened has reached the duration of emission of the anode off-gas thus determined.

While the controller 20 determines that there is no request for drainage of condensed water stored in the water reservoir 4 ("No" in step S201), the controller 20 repeatedly exercises control to determine whether there has been a request for drainage.

Thus, the fuel cell system 100 according to Embodiment 3 makes it possible to drain the condensed water and emit the anode off-gas through the first drainage path 5. This makes it unnecessary to separately provide a drainage path through which to drain the condensed water and an emission path through which emit the anode off-gas and therefore makes it possible to suppress the rise in the cost of manufacturing the fuel cell system 100.

Specific Example of Process for Calculating Duration of Drainage

The duration of drainage is inversely proportional to the volume of stored water in the water reservoir 4, and is proportional to the speed (drainage rate) of water passing through the valve 6 via the first drainage path 5. Further, the volume of stored water and the drainage rate vary according to time-dependent changes in the flow rate of the anode off-gas.

For example, an increase in the proportion of water vapor that is contained in the anode off-gas leads to an increase in the amount of water vapor that is contained in the anode off-gas. This leads to an increase in the amount of water that is condensed, and by extension to an increase in the volume of stored water in the water reservoir 4, resulting in an increase in duration of drainage.

Further, an increase in the flow rate of the anode off-gas leads to an increase in the amount of water vapor that is contained in the anode off-gas. This leads to an increase in the amount of water that is condensed, and by extension to an increase in the volume of stored water in the water reservoir 4, resulting in an increase in duration of drainage.

Further, an increase in temperature of the anode off-gas after the formation of condensed water leads to an increase in the proportion of water that is present in a water vapor state and a decrease in the amount of water that is condensed. This leads to a decrease in the volume of stored water in the water reservoir 4, resulting in a decrease in duration of drainage. Conversely, an increase in temperature of the anode off-gas at the outlet of the fuel cell 1 in the recycle gas path 3 leads to an increase in the amount of water vapor that is contained in the anode off-gas, and by extension to an increase in the amount of water that is formed by condensation. This leads to an increase in the volume of stored water in the water reservoir 4, resulting in an increase in duration of drainage.

Further, an increase in pressure of the anode off-gas leads to an increase in drainage rate, and by extension to a decrease in duration of drainage.

Through the utilization of the relationships described above, the fuel cell system 100 calculates the proportion of water vapor contained in the anode off-gas and the flow rate, temperature, and pressure of the anode off-gas according to the amount of electricity generated by the fuel cell 1 and calculates the volume of stored water and the drainage rate on the basis of these values. Then, the duration of drainage is calculated from the volume of stored water and the drainage rate thus calculated.

The following describes an example of a method for calculating the duration of drainage by calculating the volume of stored water and the drainage rate.

That is, the duration of drainage $t_e$ (sec)=V/v can be calculated using the volume of stored water V (cc) in the water reservoir 4 and the drainage rate v (cc/sec) of water stored, which are calculated on the basis of the proportion of water vapor contained in the anode off-gas and the flow rate, temperature, and pressure of the anode off-gas. This makes it possible to close the valve 6 at an appropriate time without using a water volume sensor and therefore makes it possible to suppress the rise in cost.

The fuel cell system 100 calculates the volume of stored water V and the drainage rate v from the values of the proportion R of water vapor contained in the anode off-gas, the flow rate Q, the temperature T, and the pressure P, which have been calculated on the basis of quantities of state at the inlet of the fuel gas supply path 2 depending on the amount of electricity generated by the fuel cell 1. Moreover, the fuel cell system 100 is configured to determine the duration of drainage $t_e$ from the volume of stored water V and the drainage rate v thus calculated.

The inlet of the fuel gas supply path 2 may for example be any one of the following places. For example, in the case of a configuration in which the fuel gas supply path 2 is provided with a governor that adjusts the flow rate of the fuel gas that is supplied to the fuel cell 1, this governor (not illustrated) may be used as the inlet of the fuel gas supply path 2. Alternatively, in the case of a configuration in which a reformer (not illustrated) connected to the fuel gas supply path 2 is provided and a reformed gas reformed by the reformer is supplied as the fuel gas to the fuel cell 1, an outlet of the reformer may be used as the inlet of the fuel gas supply path 2. Alternatively, in the case of a configuration in which hydrogen is supplied as the fuel gas to the fuel cell 1 from a hydrogen storage tank connected to the fuel gas supply path 2, an outlet of the hydrogen storage tank may be used as the inlet of the fuel gas supply path 2. Alternatively, in the case of a configuration in which hydrogen stored in the hydrogen storage tank has its pressure raised by a booster and is supplied as the fuel gas to the fuel cell 1, an outlet of the booster may be used as the inlet of the fuel gas supply path 2.

Further, the quantities of state at the inlet of the fuel gas supply path 2 are equivalent to the pressure and flow rate of the fuel gas, the proportion of water vapor contained in the anode off-gas, the temperature, and the like at the inlet.

The following first describes a configuration in which the controller 20 uses a computation model to determine the proportion R of water vapor contained in the anode off-gas, the flow rate Q, the temperature T, and the pressure P. The term "computation model" herein means physical formulas and empirical formulas that represent the device characteristics of the fuel cell system 100.

Flow Rate of Anode Off-Gas

Figure 20:
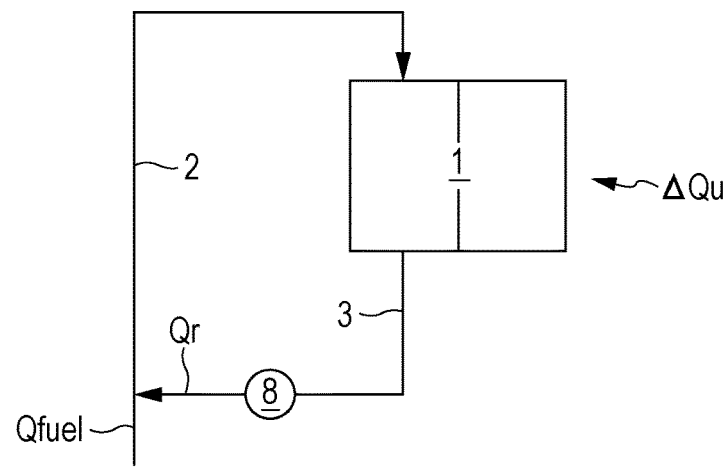
FIG. 20 is a block diagram showing examples of flow paths through which a fuel gas and an anode off-gas flow in a fuel cell system according to Embodiments 1 to 3.

Prior to a detailed description of a method for determining the flow rate Q of the anode off-gas, a configuration, pertaining to flow paths through which the fuel gas and the anode off-gas flow, that serves as a premise for this determination method is described with reference to FIG. 20. FIG. 20 is a block diagram showing examples of flow paths through which a fuel gas and an anode off-gas flow in a fuel cell system 100 according to Embodiments 1 to 3. FIG. 20 omits to illustrate members that are not involved in the flow of the fuel gas and the anode off-gas.

As shown in FIG. 20, the fuel cell system 100 is configured such that the recycle gas path 3 is provided with a recycle gas circulator 8 that raises the pressure of the anode off-gas. Moreover, the fuel cell system 100 is configured such that the anode off-gas whose pressure has been raised by the recycle gas circulator 8 passes through the recycle gas path 3 and merges with the fuel gas flowing through the fuel gas supply path 2.

In such a configuration, the flow rate Q of the anode off-gas is determined on the basis of the flow rate $Q_{fuel}$ (mol/s) of the fuel gas that is supplied to the inlet of the fuel gas supply path 2, the amount of change $Q_u$ (mol/s) in the flow rate of the fuel gas that changes with the generation of electricity, and a recycle gas flow rate $Q_r$ (mol/s), which is the flow rate of the anode off-gas that flows through the recycle gas path 3.

The flow rate $Q_{fuel}$ (mol/s) of the fuel gas that is supplied to the inlet of the fuel gas supply path 2 can be calculated according to Eq. (1) as follows on the basis of the amount of electricity W (W) generated by the fuel cell 1:

$$Q_{fuel} = A \times W \tag{1}$$

where A is a function that is determined on the basis of the power generation characteristics of the fuel cell 1 and the utilization factor of the fuel gas, and is a coefficient for calculating the flow rate of the fuel gas that is needed for the fuel cell 1 to generate a desired amount of electricity.

In the configuration in which the fuel gas supply path 2 is provided with a governor, the fuel gas is supplied to the fuel cell 1 at a pressure that is lower by the flow rate of the fuel gas consumed by the fuel cell 1. For this reason, in a case where the inlet of the fuel gas supply path 2 is a governor, the utilization factor of the fuel gas is 100% (=1). Meanwhile, in a case where the inlet of the fuel gas supply path 2 is an outlet of a booster such as a pump, the utilization factor of the fuel gas can for example be 70%.

The amount of change $Q_u$ (mol/s) in the flow rate of the fuel gas, which changes with the generation of electricity by the fuel cell 1, can be calculated according to Eq. (2) as follows on the basis of the amount of electricity W (W) generated by the fuel cell 1:

$$Q_u = B \times W \tag{2}$$

where B is a function that is determined on the basis of the power generation characteristics of the fuel cell 1, and is a value that is proportional to the value of a current produced by the generation of electricity by the fuel cell 1.

The recycle gas flow rate $Q_r$ (mol/s) can be calculated according to Eq. (3) as follows on the basis of a circulator actuating variable U (%) of the fuel gas that is determined on the basis of the amount of electricity generated by the fuel cell 1:

$$Q_r = C \times U \tag{3}$$

where C is a function that is determined on the basis of the type and performance of the recycle gas circulator 8 and the proportion of water vapor contained in the anode off-gas. That is, the recycle gas flow rate $Q_r$ can be said to be a value that is determined by determining a voltage (actuating variable) that is applied to the recycle gas circulator 8.

On the basis of the flow rate $Q_{fuel}$ of the fuel gas that flows into the fuel cell system 100, the amount of change $Q_u$ in the flow rate of the fuel gas with the generation of electricity, and the recycle gas flow rate $Q_r$ thus calculated, the flow rate Q of the anode off-gas can be determined according to Eq. (4) as follows:

$$Q = Q_{fuel} + Q_r - Q_u \tag{4}$$

Proportion of Water Vapor Contained in Anode Off-Gas

Figure 21:
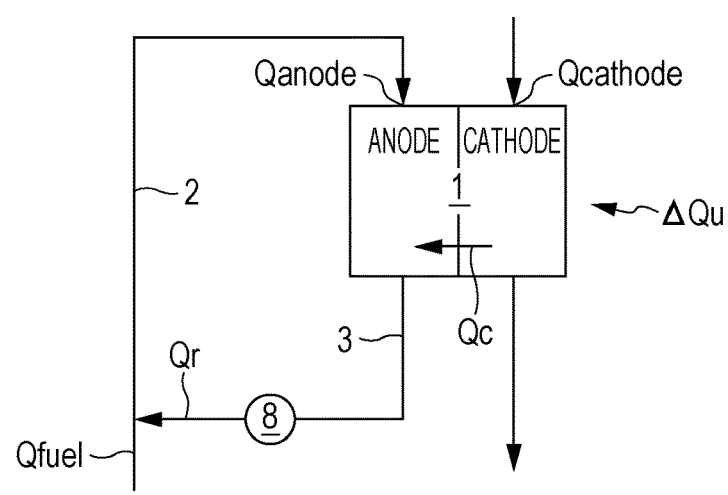
FIG. 21 is a block diagram showing examples of flow paths through which a fuel gas, an anode off-gas, an oxidant gas, and a cathode off-gas flow in a fuel cell system according to Embodiments 1 to 3.

Next, prior to a detailed description of a method for determining the proportion R of water vapor contained in the anode off-gas, a configuration, pertaining to flow paths through which the fuel gas, the anode off-gas, the oxidant gas, and the cathode off-gas flow, that serves as a premise for this determination method is described with reference to FIG. 21. FIG. 21 is a block diagram showing examples of flow paths through which a fuel gas, an anode off-gas, an oxidant gas, and a cathode off-gas flow in a fuel cell system 100 according to Embodiments 1 to 3. FIG. 21 omits to illustrate members that are not involved in the flow of the fuel gas, the anode off-gas, the oxidant gas, and the cathode off-gas. As shown in FIG. 21, the fuel cell system 100 is configured such that the fuel gas is supplied to the anode of the fuel cell 1 and that the anode off-gas emitted from the anode has its pressure raised by the recycle gas circulator 8, merges with the fuel gas, and is supplied to the fuel cell 1 again. Further, the fuel cell system 100 is configured such that the oxidant gas is supplied to the cathode of the fuel cell 1 and that the cathode off-gas emitted from the cathode is emitted out of the system.

In such a configuration, the proportion R of water vapor contained in the anode off-gas is determined on the basis of an anode inlet flow rate $Q_{anode}$ (mol/s) which is the flow rate of the fuel gas that flows into an inlet of the anode of the fuel cell 1, the amount of change $Q_u$ (mol/s) in the flow rate of the fuel gas that changes with the generation of electricity by the fuel cell 1, and the amount of impurity $Q_c$ (mol/s) transmitted from the cathode to the anode.

First, the anode inlet flow rate $Q_{anode}$ (mol/s) can be calculated according to Eq. (5) as follows on the basis of the flow rate $Q_{fuel}$ (mol/s) of the fuel gas that flows into the fuel cell system 100 and the recycle gas flow rate $Q_r$ (mol/s):

$$Q_{anode} = Q_{fuel} + Q_r \quad (5)$$

Further, the amount of change $Q_u$ (mol/s) in the flow rate of the fuel gas that changes with the generation of electricity by the fuel cell 1 can be calculated according to Eq. (2) as noted above ($Q_u = A \times W$).

The amount of impurity $Q_c$ (mol/s) transmitted from the cathode to the anode in the fuel cell 1 can be calculated according to Eq. (6) as follows on the basis of the cathode inlet pressure $P_{cathode}$(Pa) of the fuel cell 1 and the anode inlet pressure $P_{anode}$ (Pa) of the fuel cell 1:

$$Q_c = D \times (P_{cathode} - P_{anode}) \quad (6)$$

where D is a function that is determined on the basis of the temperature and moisture content of the polyelectrolyte membrane. Further, the cathode inlet pressure $P_{cathode}$(Pa) of the fuel cell 1 is determined on the basis of a cathode inlet flow rate $Q_{cathode}$ (mol/s), which is the flow rate of air that is supplied to an inlet of the anode of the fuel cell 1, which is determined on the basis of the amount of electricity W (W) generated by the fuel cell 1; atmospheric pressure $P_{atm}$ (Pa); the pressure $P_{cathode}$ (Pa) of cathode air whose pressure has been raised by a booster (not illustrated); and a pressure loss $P_{loss\_c}$ (Pa) between an outlet of the booster and a cathode inlet of the fuel cell 1.

Further, the anode inlet pressure $P_{anode}$ of the fuel cell 1 is determined on the basis of a pressure loss $P_{loss\_a}$ (Pa) from the inlet of the fuel gas supply path 2 to an anode inlet of the fuel cell 1, which is calculated from the flow rate $Q_{fuel}$ (mol/s) of the fuel gas, which is determined on the basis of the amount of electricity W (W) generated by the fuel cell 1, and the pressure $P_{in}$ (Pa) of the fuel gas at the inlet of the fuel gas supply path 2 (see Eq. (11) below).

Note here that the cathode inlet flow rate $Q_{cathode}$ (mol/s) can be calculated according to Eq. (7) as follows:

$$Q_{cathode} = E \times W \quad (7)$$

where E is a function that is determined on the basis of the power generation characteristics of the fuel cell 1 and the utilization factor of the cathode air.

Further, the pressure loss $P_{loss\_c}$ (Pa) can be calculated according to Eq. (8) as follows:

$$P_{loss\_c} = F \times Q_{cathode}^2 \quad (8)$$

where F is a coefficient of loss, which is a function that is determined on the basis of the shape and length of a cathode air path (not illustrated). The term "cathode air path" here means a path from an outlet of an air supplier to the inlet of the cathode of the fuel cell 1.

Further, the cathode inlet pressure $P_{cathode}$ (Pa) can be calculated according to Eq. (9) as below. That is, the cathode inlet pressure $P_{cathode}$ (Pa) can be calculated on the basis of atmospheric pressure $P_{atm}$ (Pa), the magnitude of pressure $P_{boost}$ at which the cathode air has its pressure raised by the booster (not illustrated), and the pressure loss $P_{loss\_c}$ (Pa).

$$P_{cathode} = P_{atm} + P_{boost} - P_{loss\_c} \quad (9)$$

Meanwhile, the anode inlet pressure $P_{anode}$ (Pa) is determined on the basis of the flow rate $Q_{fuel}$ (mol/s) of the fuel gas that is supplied to the inlet of the fuel gas supply path 2 as calculated according to Eq. (1) above, the pressure $P_{in}$ (Pa) of the fuel gas at the inlet of the fuel gas supply path 2, and the pressure loss $P_{loss\_a}$ (Pa) between the inlet of the fuel gas supply path 2 and the anode inlet of the fuel cell 1.

Note here that the pressure $P_{in}$ (Pa) of the fuel gas at the inlet of the fuel gas supply path 2 is generally given by a fixed value ($P_{in}$=const.).

Further, the pressure loss $P_{loss\_a}$ (Pa) can be calculated according to Eq. (10) as below. That is, the pressure loss $P_{loss\_a}$ (Pa) can be calculated on the basis of the flow rate $Q_{fuel}$ (mol/s) of the fuel gas that is supplied to the inlet of the fuel gas supply path 2 and a coefficient of loss G. It should be noted that the coefficient of loss G is a function that is determined on the basis of the length and shape of the fuel gas supply path 2. In the case of a configuration in which a governor is provided on the fuel gas supply path 2 and the flow rate of the fuel gas that is supplied to the fuel cell 1 is adjusted by this governor, the length of the fuel gas supply path 2 here may be the length of a path from this governor to the anode inlet of the fuel cell 1. Alternatively, in the case of a configuration in which a reformer (not illustrated) is provided and a reformed gas reformed by the reformed is supplied as the fuel gas to the fuel cell 1, the length of the fuel gas supply path 2 here may be the length of a path from an outlet of the reformer to the anode inlet of the fuel cell 1. Alternatively, in the case of a configuration in which hydrogen is supplied as the fuel gas to the fuel cell 1 from a hydrogen storage tank, the length of the fuel gas supply path 2 here may be the length of a path from an outlet of the hydrogen storage tank to the anode inlet of the fuel cell 1.

Further, the anode inlet pressure $P_{anode}$ can be calculated according to Eq. (11) as below.

$$P_{loss\_a} = G \times (Q_{fuel} + Q_r)^2 \quad (10)$$

$$P_{anode} = P_{in} - P_{loss\_a} \quad (11)$$

As noted above, the proportion of water vapor contained in the anode off-gas is determined according to Eq. (12) as below on the basis of the anode inlet flow rate $Q_{anode}$, the amount of change $Q_u$ in the flow rate of the fuel gas, which changes with the generation of electricity by the fuel cell 1, and the amount of impurity $Q_c$ transmitted from the cathode to the anode, which have been calculated according to Eqs. (1) to (11). That is, the proportion of nitrogen as an impurity can be calculated by determining the ratio between a value obtained by adding together the anode inlet flow rate $Q_{anode}$ and the amount of change $Q_u$ in the flow rate of the fuel gas and the amount of impurity $Q_c$ transmitted from the cathode to the anode.

$$Q_c/(Q_{anode} + Q_u) \quad (12)$$

Furthermore, the proportion R of water vapor contained in the anode off-gas can be calculated according to Eq. (13) as follows on the basis of the amount of change $Q_u$ in the flow rate of the fuel gas, the amount of impurity $Q_c$ transmitted from the cathode to the anode, an anode inlet hydrogen flow rate $Q_H$, which is the flow rate of hydrogen that is contained in the fuel gas flowing into the inlet of the anode of the fuel cell 1, and the anode inlet flow rate $Q_{anode}$:

$$R = 1 - (Q_c + Q_H + Q_u)/(Q_{anode} + Q_u) \quad (13)$$

Temperature of Anode Off-Gas

The following describes in detail a method for determining the temperature of the anode off-gas. The temperature of the anode off-gas to be determined here is the temperature of the anode off-gas at the outlet of the fuel cell 1. First, a configuration, pertaining to a flow path through which the cooling water flows, that serves as a premise for this determination method is described with reference to FIG.

Figure 22:
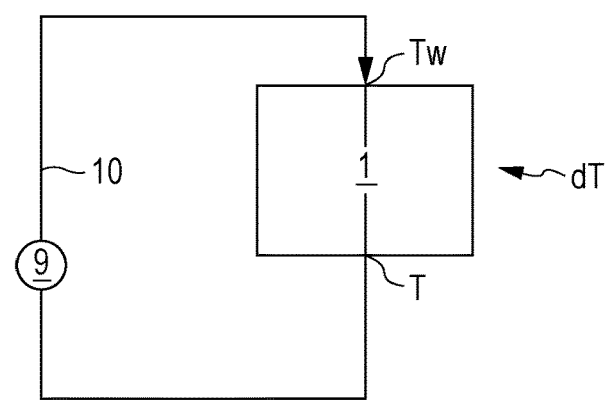
FIG. 22 is a block diagram showing an example of a flow path through which cooling water flows in a fuel cell system according to Embodiments 1 to 3.

22. FIG. 22 is a block diagram showing an example of a flow path through which cooling water flows in a fuel cell system 100 according to Embodiments 1 to 3. FIG. 22 omits to illustrate members that are not involved in the flow of the cooling water.

As shown in FIG. 22, the fuel cell system 100 according to Embodiments 1 to 3 includes a cooling water circulator 9 that circulates the cooling water and supplies it to the fuel cell 1 and a cooling water path 10 through which the cooling water flows, and is configured such that the cooling water circulator 9 is activated to supply the cooling water to the fuel cell 1.

The temperature T (° C.) of the anode off-gas is substantially the same temperature as the temperature, at the outlet of the fuel cell 1, of the cooling water supplied to the fuel cell 1. For this reason, the temperature of the cooling water at the outlet of the fuel cell 1 is calculated as the temperature T (° C.) of the anode off-gas.

First, the fuel cell inlet temperature $T_W$ (° C.) of the cooling water, which is the temperature of the cooling water at the inlet of the fuel cell 1, is calculated.

The fuel cell inlet temperature $T_W$ (° C.) of the cooling water can be calculated on the basis of a cooling water flow rate $Q_W$ (mol/s) that is determined on the basis of the amount of electricity W (W) generated by the fuel cell 1, the quantity of heat q (W) that is absorbed by the cooling water between an outlet of the cooling water path 9 and the inlet of the fuel cell 1, and the circulator outlet temperature $T_{W0}$ (° C.) of the cooling water, which is the temperature of the cooling water at the outlet of the cooling water path 9. First, the cooling water flow rate $Q_W$ (mol/s) can be calculated according to Eq. (14) as follows:

$$Q_W = H \times W \quad (14)$$

where H is a function that is determined on the basis of the power generation characteristics of the fuel cell 1 and the radiation of heat outward from the fuel cell 1.

Further, the quantity of heat q (W) that is absorbed by the cooling water can be calculated according to Eq. (15) as follows:

$$q = I \times W \quad (15)$$

where I is a function that is determined on the basis of the power generation characteristics of the fuel cell 1, the external temperature around the cooling water path 10, and the external radiation of heat from the cooling water path 10.

Then, through the use of the values calculated according to Eqs. (14) and (15) as above, the fuel cell inlet temperature $T_W$ (° C.) of the cooling water can be calculated according to Eq. (16) as follows:

$$T_W = T_{W0} - J \, Q_W \times q \times C_W \times \rho_W \quad (16)$$

where J is a coefficient of unit conversion, $C_W$ is the specific heat of water, and $\rho_W$ is the density of water.

Further, a rise in temperature dT (° C.) of the cooling water inside the fuel cell 1 can be calculated on the basis of the amount of heat generation $q_{st}$ (W) of the fuel cell 1, which is determined from the amount of electricity W (W) generated by the fuel cell 1. First, the amount of heat generation of the fuel cell 1 can be calculated according to Eq. (17) as follows:

$$q_{st} = K \times W \quad (17)$$

where K is a function that is determined on the basis of the power generation characteristics of the fuel cell 1. On the basis of the amount of heat generation $q_{st}$ (W) of the fuel cell 1, which has been calculated according to Eq. (17), the specific heat of water $C_W$ (J/(kg·K)), and the density of water $\rho_W$ (Kg/m³), the rise in temperature dT (° C.) of the cooling water inside the fuel cell 1 is calculated according to Eq. (18) as follows:

$$dT = L \times Q_W \times q_{st} \div C_W \times \rho_W \quad (18)$$

where L is a function that is determined on the basis of the external radiation of heat from the fuel cell 1.

On the basis of the fuel cell inlet temperature $T_W$ of the cooling water, which has been calculated according to Eq. (16), and the rise in temperature dT (° C.) of the cooling water inside the fuel cell 1, which has been calculated according to Eq. (18), the temperature T of the anode off-gas is determined according to Eq. (19) as follows:

$$T = T_W + dT \quad (19)$$

Pressure of Anode Off-Gas

The following describes a method for determining the pressure of the anode off-gas.

The pressure P (Pa) of the anode off-gas is determined on the basis of the pressure $P_{in}$ (Pa) of the fuel gas that is supplied to the inlet of the fuel gas supply path 2, the pressure loss $P_{loss\_a}$ (Pa) between the inlet of the fuel gas supply path 2 and the anode inlet of the fuel cell 1, and the pressure loss $P_{a2}$ of the fuel gas in the fuel cell 1.

Note here that, as mentioned above, the pressure $P_{in}$ (Pa) of the fuel gas that is supplied to the inlet of the fuel gas supply path 2 is generally given by a fixed value. Further, the pressure loss $P_{loss\_a}$ (Pa) between the inlet of the fuel gas supply path 2 and the anode inlet of the fuel cell 1 can be calculated according to Eq. (10) as above.

The pressure loss $P_{a2}$ of the fuel gas in the fuel cell 1 can be calculated according to Eq. (20) as follows on the basis of the flow rate $Q_{fuel}$ (mol/s) of the fuel gas:

$$P_{a2} = M \times Q_{fuel}^2 \quad (20)$$

where M is a function that is determined on the basis of shape and length of the anode channel (not illustrated) in the fuel cell 1.

On the basis of the pressure $P_{in}$ (Pa) of the fuel gas and the pressure loss $P_{loss\_a}$ (Pa) thus calculated, the pressure P (Pa) of the anode off-gas can be determined according to Eq. (21) as follows:

$$P = P_{in} - P_{loss\_a} - P_{a2} \quad (21)$$

Calculation of Duration of Drainage

The volume of stored water V and the drainage rate v are calculated from the values of the proportion R of water vapor contained in the anode off-gas, the flow rate Q, the temperature T, and the pressure P, which have thus been calculated on the basis of the quantities of state at the inlet of the fuel gas supply path 2 depending on the amount of electricity generated by the fuel cell 1. Then, the duration of drainage $t_e$ is determined from the volume of stored water V and the drainage rate v thus calculated.

First, as indicated by Eq. (22) below, the drainage rate v [cc/sec] is represented by a function f that is defined on the basis of the pressure P (Pa) of the anode off-gas and the length and shape of the first drainage path 5.

$$v = f(P) \quad (22)$$

Meanwhile, the volume of stored water V [cc] is calculated at each time step according to Eq. (23) as follows on the basis of the flow rate Q of the anode off-gas, the flow rate $Q(H_2)$ of hydrogen that is contained in the anode off-gas, a function f(T, R) based on the temperature T of the anode off-gas and the proportion R of water vapor contained in the anode off-gas, and a function f(t) based on the temperature T of the anode off-gas:

$$V(t)=V(t-1)+dt\times(Q\times f(T,R)-Q(H_2)\times f(T)) \quad (23)$$

where V(t) denotes the volume of stored water at a particular time step t, V(t−1) denotes the volume of stored water at a time step (t−1) immediately preceding the time step t, and dt denotes the duration of each time step.

Through the use of the drainage rate v [cc/sec] and the volume of stored water V [cc] thus determined, the duration of drainage $t_e$ [sec] can be determined according to Eq. (24) as follows:

$$t_e=V/v \quad (24)$$

By thus using the computation model constituted by Eqs. (1) to (24) described above, the fuel cell system 100 according to Embodiments 1 to 3 can acquire the proportion R of water vapor contained in the anode off-gas, the flow rate Q, the temperature T, the pressure P, and any of the values, namely the volume of stored water V, the discharge rate v, and the duration of drainage $t_e$, which have been determined from the proportion R of water vapor contained in the anode off-gas, the flow rate Q, the temperature T, and the pressure P. This makes it possible to reduce the number of sensors that are needed to acquire these values and therefore makes it possible to suppress the rise in the cost of the fuel cell system 100.

Although the foregoing has described a configuration in which the computation model is used to determine the proportion R of water vapor contained in the anode off-gas, the flow rate Q, the temperature T, and the pressure P, this is not intended to impose any limitation. For example, a sensor may be provided which can directly calculate the value of at least one of these parameters, and a result of detection yielded by the sensor may be used as the value of at least one of the proportion R of water vapor contained in the anode off-gas, the flow rate Q, the temperature T, and the pressure P.

It should be noted that all of the embodiments described above may be combined with one another unless they are mutually exclusive.

From the foregoing description, many improvements to and other embodiments of the present disclosure are apparent to a person skilled in the art. Therefore, the foregoing description should be interpreted solely as illustration, and is provided for the purpose of teaching a person skilled in the art the best mode for carrying out the present disclosure. Details of the structure and/or function of the present disclosure can be substantially changed without departing from the spirit of the present disclosure.

A fuel cell system of the present disclosure is useful as a fuel cell system that makes it possible to suppress the rise in cost and, for example, is applicable to a stationary or on-board fuel cell system.

What is claimed is:

1. A fuel cell system comprising:
    a fuel cell configured to generate electricity using a fuel gas and an oxidant gas;
    a fuel gas supply path through which a fuel gas to be supplied to an anode of the fuel cell flows;
    a recycle gas path through which an anode off-gas emitted from the anode of the fuel cell is returned to the fuel gas supply path;
    a water reservoir that holds water separated from the anode off-gas flowing through the recycle gas path;
    a drainage path through which water stored in the water reservoir is drained;
    a valve provided on the drainage path; and
    a controller that includes a processor and a storage that stores a program,
    wherein the program, when executed by the processor, causes the controller to, when the fuel cell is operating at a rated output:
        open the valve in response to a request for drainage of the anode off-gas,
        determine, without using a water volume sensor, a length of time for which the valve continues to be opened for draining the water stores in the water reservoir,
        (i) by using an integrated value of the flow rate of the anode off-gas obtained from a history of a flow rate of the anode off-gas, the history comprising time-dependent changes in the flow rate of the anode off-gas during the valve being closed, and
        (ii) by using any one of a history of an amount of electricity generated by the fuel cell, a history of a temperature of the anode off-gas, a history of an amount of water vapor that is contained in the anode off-gas, and a pressure of the anode off-gas at a time of opening of the valve, and
        close the valve when a time from opening the valve reaches the determined length of time.

2. The fuel cell system according to claim 1, wherein the program causes the controller to, when an integrated value of the flow rate of the anode off-gas during closing of the valve prior to opening of the valve for draining the water stored in the water reservoir becomes greater than an integrated value of the flow rate of the anode off-gas prior to previous opening of the valve, make the length of time for which the valve continues to be opened for draining the water stored in the water reservoir longer than at a time of the previous opening of the valve.

3. The fuel cell system according to claim 1, wherein the program causes the controller to estimate the flow rate of the anode off-gas by using the amount of electricity generated by the fuel cell.

4. The fuel cell system according to claim 1, wherein the program causes the controller to estimate the flow rate of the anode off-gas by using a flow rate of the fuel gas at an inlet of the fuel gas supply path.

5. The fuel cell system according to claim 1, wherein the program causes the controller to determine the length of time for which the valve continues to be opened for draining the water stored in the water reservoir by using (i) the history of a flow rate of the anode off-gas, and (ii) the history of the amount of electricity generated by the fuel cell.

6. The fuel cell system according to claim 5, wherein the program causes the controller to, when an integrated value of the amount of electricity generated by the fuel cell during closing of the valve prior to opening of the valve for draining the water stored in the water reservoir becomes greater than an integrated value of the amount of electricity generated by the fuel cell prior to previous opening of the valve, make the length of time for which the valve continues to be opened for draining the water stored in the water reservoir longer than at a time of the previous opening of the valve.

7. The fuel cell system according to claim 1, wherein the program causes the controller to determine the length of time for which the valve continues to be opened for draining the water stored in the water reservoir by using (i) the history of a flow rate of the anode off-gas, and (ii) the history of the temperature of the anode off-gas.

8. The fuel cell system according to claim 7, wherein the program causes the controller to, when an integrated value of the temperature of the anode off-gas during closing of the valve prior to opening of the valve for draining the water stored in the water reservoir becomes smaller than an integrated value of the temperature of the anode off-gas prior to previous opening of the valve, make the length of time for which the valve continues to be opened for draining the water stored in the water reservoir shorter than at a time of the previous opening of the valve.

9. The fuel cell system according to claim 7, wherein the program causes the controller to estimate the temperature of the anode off-gas by using the amount of electricity generated by the fuel cell.

10. The fuel cell system according to claim 7, wherein the program causes the controller to estimate the temperature of the anode off-gas by using the temperature of the fuel gas at an inlet of the fuel gas supply path.

11. The fuel cell system according to claim 1, wherein the program causes the controller to determine the length of time for which the valve continues to be opened for draining the water stored in the water reservoir by using (i) the history of a flow rate of the anode off-gas, and (ii) the history of the amount of water vapor that is contained in the anode off-gas.

12. The fuel cell system according to claim 11, wherein the program causes the controller to, when an integrated value of the amount of water vapor that is contained in the anode off-gas during closing of the valve prior to opening of the valve for draining the water stored in the water reservoir becomes greater than an integrated value of the amount of water vapor that is contained in the anode off-gas prior to previous opening of the valve, make the length of time for which the valve continues to be opened for draining the water stored in the water reservoir longer than at a time of the previous opening of the valve.

13. The fuel cell system according to claim 11, wherein the program causes the controller to estimate the amount of water vapor that is contained in the anode off-gas by using the amount of electricity generated by the fuel cell.

14. The fuel cell system according to claim 11, wherein the program causes the controller to estimate the amount of water vapor that is contained in the anode off-gas by using an amount of water vapor that is contained in the fuel gas at an inlet of the fuel gas supply path.

15. The fuel cell system according to claim 1, wherein the program causes the controller to determine the length of time for which the valve continues to be opened for draining the water stored in the water reservoir by using (i) the history of a flow rate of the anode off-gas, and (ii) the history of the pressure of the anode off-gas at the time of opening of the valve.

16. The fuel cell system according to claim 15, wherein the program causes the controller to, when the pressure of the anode off-gas at the time of opening of the valve becomes higher than at a time of previous opening of the valve, make the length of time for which the valve continues to be opened for draining the water stored in the water reservoir shorter than at the time of the previous opening of the valve.

17. The fuel cell system according to claim 15, wherein the program causes the controller to estimate the pressure of the anode off-gas by suing the amount of electricity generated by the fuel cell.

18. The fuel cell system according to claim 1, wherein the program causes the controller to cause the valve to be opened even after drainage of the water stored in the water reservoir and to emit the anode off-gas via the water reservoir and the drainage path.

* * * * *